(12) United States Patent
Harada et al.

(10) Patent No.: US 8,459,224 B2
(45) Date of Patent: Jun. 11, 2013

(54) AIR INTAKE APPARATUS FOR VEHICLE

(75) Inventors: Akihiro Harada, Kariya (JP); Masao Ino, Toyota (JP); Yasutoshi Kameda, Toyota (JP)

(73) Assignee: Denso Corporation, Kariya (JP)

( * ) Notice: Subject to any disclaimer, the term of this patent is extended or adjusted under 35 U.S.C. 154(b) by 344 days.

(21) Appl. No.: 13/039,621

(22) Filed: Mar. 3, 2011

(65) Prior Publication Data

US 2011/0232598 A1 Sep. 29, 2011

(30) Foreign Application Priority Data

Mar. 25, 2010 (JP) .................................... 2010-70866
Sep. 22, 2010 (JP) ................................. 2010-212376
Jan. 6, 2011 (JP) .................................. 2011-001439

(51) Int. Cl.
*F02M 35/10* (2006.01)
(52) U.S. Cl.
USPC ................................ 123/184.47; 123/184.53
(58) Field of Classification Search
USPC ............. 123/184.24–184.26, 184.34–184.36, 123/184.42–184.44, 184.47–184.49, 184.51, 123/184.53
See application file for complete search history.

(56) References Cited

U.S. PATENT DOCUMENTS

2009/0199813 A1 8/2009 Kuzuyama et al.

FOREIGN PATENT DOCUMENTS

JP 2005-226476 8/2005

OTHER PUBLICATIONS

Chinese Office Action ( 6 pages) dated Nov. 26, 2012 issued in corresponding Chinese Application No. 201110080201.3, with English Translation (6 pages).

*Primary Examiner* — Noah Kamen
(74) *Attorney, Agent, or Firm* — Nixon & Vanderhye PC

(57) ABSTRACT

An intake manifold is located on a downstream side of a throttle valve in an intake passage. A switching valve is placed on an upstream side of a connection between a communication conduit and an outlet of a lower portion of a surge tank of the intake manifold and is adapted to open or close the communication conduit. A control device controls the switching valve to open or close the switching valve. The control device closes the switching valve when an operational state of an engine is in one of idling time, accelerating driving time and high speed driving time of a vehicle, and the control device opens the switching valve when the operational state of the internal combustion engine is in decelerating driving time of the vehicle.

15 Claims, 17 Drawing Sheets

US 8,459,224 B2

AIR INTAKE APPARATUS FOR VEHICLE

CROSS REFERENCE TO RELATED APPLICATION

This application is based on and incorporates herein by reference Japanese Patent Application No. 2010-70866 filed on Mar. 25, 2010, Japanese Patent Application No. 2010-212376 filed on Sep. 22, 2010 and Japanese Patent Application No. 2011-1439 filed on Jan. 6, 2011.

BACKGROUND OF THE INVENTION

1. Field of the Invention

The present invention relates to an air intake apparatus of a vehicle, which guides fluid accumulated in a portion of a surge tank into a cylinder of an internal combustion engine.

2. Description of Related Art

In the following description, a top-to-bottom direction refers to a top-to-bottom direction (vertical direction) upon installation of the vehicle air intake apparatus in a vehicle placed on a horizontal plane without tilting. Also, an upper side and an lower side refers to an upper side and a lower side in the vertical direction upon the installation of the vehicle air intake apparatus in the vehicle placed on the horizontal plane without tilting.

A previously known vehicle air intake apparatus has a surge tank, which is formed by enlarging a passage cross-sectional area of an intake passage, which conducts air to cylinders of the engine.

In a case where an exhaust gas recirculation (EGR) apparatus is provided to recirculate a portion of exhaust gas, which flows in an exhaust passage, into the intake passage as EGR gas, due to presence of high content of water and/or oil in the EGR gas, the water and/or oil may condense as condensed fluid (more specifically liquid) in the surge tank of the vehicle air intake apparatus upon volume expansion of the air, which contains the EGR gas. The condensed fluid of water and/or oil may be guided to the lower portion of the surge tank by the gravitational force.

In a case where a lower edge of a connection between the surge tank and a corresponding one of intake branches (an intake passage that guides the air from the surge tank to the corresponding cylinder) is located on an upper side of a lower portion (bottom portion) of the surge tank, the condensed fluid of water and/or oil may be accumulated in the lower portion of the surge tank. Therefore, this condensed fluid, which is accumulated in the lower portion of the surge tank, cannot be guide to the cylinder of the engine.

Furthermore, there is also known another type of vehicle air intake apparatus, which has an intercooler placed in the intake passage that guides the condensed fluid, which is accumulated in the portion of the intake passage, into the cylinder of the engine.

The intercooler cools the air, which is drawn into the intake passage. When the air, which is drawn into the intake passage, is cooled, water and/or oil contained in the drawn air may condense as condensed fluid (more specifically liquid) and may be accumulated in the lower portion of the intercooler.

Japanese Unexamined Patent Publication No. 2005-226476A teaches a technique of guiding the condensed fluid of water and/or oil, which is accumulated in the lower portion of the intercooler, into the cylinder of the engine.

This technique is provided for a case where the intercooler is placed on the upstream side of a throttle valve in the flow direction of the air in the intake passage. The lower portion of the intercooler is connected to a portion of the intake passage (the portion being depressurized via the throttle valve during the time of running the engine) through a drain conduit while bypassing the throttle valve. The condensed fluid of water and/or oil is guided into the cylinder of the engine by using a pressure difference (differential pressure) between the upstream side of the throttle valve and the downstream side of the throttle valve (the pressure of the air on the upstream side of the throttle valve>the pressure of the air on the downstream side of the throttle valve).

As discussed above, the technique of Japanese Unexamined Patent Publication No. 2005-226476A uses the pressure difference (differential pressure) between the upstream side of the throttle valve and the downstream side of the throttle valve. Therefore, in the case where the surge tank is placed on the upstream side of the throttle valve, it is possible to use the pressure difference (differential pressure) between the upstream side of the throttle valve and the downstream side of the throttle valve. However, in another case where the surge tank is placed on the downstream side of the throttle valve in the intake passage, one portion of the intake passage, which is located on the downstream side of the throttle valve, is connected to another portion of the intake passage, which is located on the downstream side of the throttle valve, through the drain conduit. Therefore, in such a case, the pressure difference (differential pressure) between the upstream side of the throttle valve and the downstream side of the throttle valve cannot be used, so that the condensed fluid of water and/or oil accumulated in the lower portion of the surge tank cannot be guided into the cylinder of the engine.

Furthermore, in the technique of Japanese Unexamined Patent Publication No. 2005-226476A, the drain conduit is provided to guide the air into the cylinder of the engine while bypassing the throttle valve. Therefore, it is not possible to accurately control the quantity of the air drawn into the cylinder of the engine in the idling time of the engine, during which the throttle valve is fully closed.

SUMMARY OF THE INVENTION

The present invention addresses at least one of the above disadvantages.

According to the present invention, there is provided an air intake apparatus for a vehicle, including a throttle valve, an intake manifold, a communication conduit, a drain conduit, a switching valve and a control device. The throttle valve is placed in an intake passage and is adapted to adjust a quantity of air to be drawn into an internal combustion engine of the vehicle. The intake manifold is located on a downstream side of the throttle valve in a flow direction of the air in the intake passage and includes a surge tank and a plurality of intake branches. The surge tank has an enlarged passage cross-sectional area, which is larger than a passage cross-sectional area of an adjacent upstream portion of the intake passage that is adjacent to the surge tank and is located on an upstream side of the surge tank in the flow direction of the air. Each of the plurality of intake branches is located on a downstream side of the surge tank in the flow direction of the air and guides the air toward a corresponding one of a plurality of cylinders of the internal combustion engine. A lower edge of each connection between the surge tank and a corresponding one of the plurality of intake branches is placed above a lower portion of the surge tank in a vertical direction in an installed state of the air intake apparatus where the air intake apparatus is installed to the vehicle. A communication conduit communicates between an upstream portion of the intake passage, which is located on an upstream side of the throttle valve in the flow direction of the air, and at least one of the plurality of intake branches while bypassing the surge tank. The drain conduit communicates between the lower portion of the surge tank and the communication conduit in the installed state of the air intake apparatus. The switching valve is placed on an upstream side of a connection between the communication conduit and the drain conduit in the flow direction of the air in the communication conduit and is adapted to open or close the communication conduit. The control device controls the switching valve to open or close the switching valve. The control device closes the switching valve when an operational state of the internal combustion engine is in one of idling time, accelerating driving time and high speed driving time of the vehicle, and the control device opens the switching valve when the operational state of the internal combustion engine is in decelerating driving time of the vehicle.

According to the present invention, there is also provided an air intake apparatus for a vehicle, including a throttle valve, an intake manifold, a communication conduit, a vacuum switching valve and a control device. The throttle valve is placed in an intake passage and is adapted to adjust a quantity of air to be drawn into an internal combustion engine of the vehicle. The intake manifold is located on a downstream side of the throttle valve in a flow direction of the air in the intake passage and includes a surge tank and a plurality of intake branches. The surge tank has an enlarged passage cross-sectional area, which is larger than a passage cross-sectional area of an adjacent upstream portion of the intake passage that is adjacent to the surge tank and is located on an upstream side of the surge tank in the flow direction of the air. Each of the plurality of intake branches is located on a downstream side of the surge tank in the flow direction of the air and guides the air toward a corresponding one of a plurality of cylinders of the internal combustion engine. The communication conduit communicates between an upstream portion of the intake passage, which is located on an upstream side of the throttle valve in the flow direction of the air, and an upper portion of at least one of the plurality of intake branches while bypassing the surge tank. The vacuum switching valve is placed in the communication conduit and is adapted to open or close the communication conduit. The control device executes a duty control operation of energization of the vacuum switching valve. The control device stops the energization of the vacuum switching valve to close the vacuum switching valve when an operational state of the internal combustion engine is in one of idling time, accelerating driving time and high speed driving time of the vehicle. The control device energizes the vacuum switching valve in a manner that shortens each valve open time period of the vacuum switching valve in the duty control operation when the operational state of the internal combustion engine is in decelerating driving time of the vehicle. The control device energizes the vacuum switching valve in a manner that lengthens each valve open time period of the vacuum switching valve in the duty control operation when the operational state of the internal combustion engine is in a normal driving time of the vehicle. A condensed fluid storage chamber, which is configured into a generally U-shape, is provided at a location that is on a lower side of the surge tank in a vertical direction. The condensed fluid storage chamber includes a communication conduit drain portion and a communication conduit downstream portion. The communication conduit drain portion extends generally in the vertical direction from an outlet of a lower portion of the surge tank. The communication conduit downstream portion extends from an end of the communication conduit drain portion generally in a horizontal direction and then extends obliquely upward. A communication conduit upstream portion is formed in the communication conduit and has a rear end connected to an uppermost part of the communication conduit drain portion. The vacuum switching valve is placed in the communication conduit upstream portion at a location, which is located immediately before a connection of the communication conduit upstream portion to the communication conduit drain portion.

According to the present invention, there is also provided an air intake apparatus for a vehicle, including a throttle valve, an intake manifold, a communication conduit, a vacuum switching valve and a control device. The throttle valve is placed in an intake passage and is adapted to adjust a quantity of air to be drawn into an internal combustion engine of the vehicle. The intake manifold is located on a downstream side of the throttle valve in a flow direction of the air in the intake passage and includes a surge tank and a plurality of intake branches. The surge tank has an enlarged passage cross-sectional area, which is larger than a passage cross-sectional area of an adjacent upstream portion of the intake passage that is adjacent to the surge tank and is located on an upstream side of the surge tank in the flow direction of the air. Each of the plurality of intake branches is located on a downstream side of the surge tank in the flow direction of the air and guides the air toward a corresponding one of a plurality of cylinders of the internal combustion engine. The communication conduit communicates between an upstream portion of the intake passage, which is located on an upstream side of the throttle valve in the flow direction of the air, and an upper portion of at least one of the plurality of intake branches while bypassing the surge tank. The vacuum switching valve is placed in the communication conduit and is adapted to open or close the communication conduit. The control device executes a duty control operation of energization of the vacuum switching valve. The control device stops the energization of the vacuum switching valve to close the vacuum switching valve when an operational state of the internal combustion engine is in one of idling time, accelerating driving time and high speed driving time of the vehicle. The control device energizes the vacuum switching valve in a manner that shortens each valve open time period of the vacuum switching valve in the duty control operation when the operational state of the internal combustion engine is in decelerating driving time of the vehicle. The control device energizes the vacuum switching valve in a manner that lengthens each valve open time period of the vacuum switching valve in the duty control operation when the operational state of the internal combustion engine is in a normal driving time of the vehicle. A storage tank is provided at a location that is on a lower side of the surge tank in a vertical direction. An outlet of a lower portion of the surge tank and the storage tank are communicated with each other through a drain conduit. A condensed fluid storage chamber, which is configured into a generally U-shape, is provided at a location that is on a lower side of the storage tank in the vertical direction. The condensed fluid storage chamber includes a communication conduit drain portion and a communication conduit downstream portion. The communication conduit drain portion extends from an outlet of a lower portion of the storage tank generally in the vertical direction. The communication conduit downstream portion extends from an end of the communication conduit drain portion generally in a horizontal direction and then extends obliquely upward. A communication conduit upstream portion is formed in the communication conduit and has a rear end connected to an upper part of the storage tank. The vacuum switching valve is placed in the communication conduit upstream portion at a location, which is adjacent to a connection of the communication conduit upstream portion to the upper part of the storage tank.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Various embodiments of the present invention will be described with reference to the accompanying drawings.

First Embodiment

Figure 1:
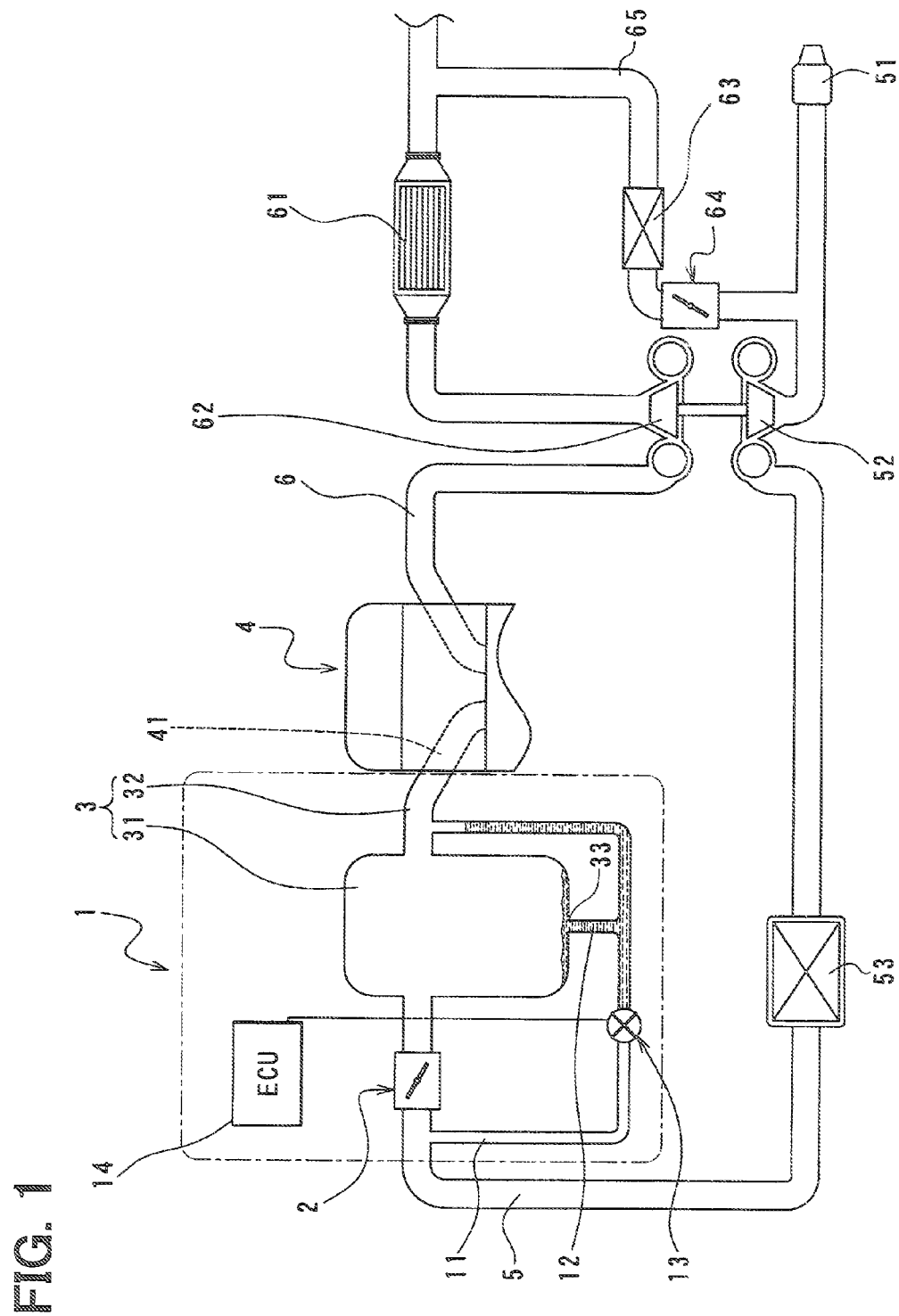
FIG. 1 is a schematic diagram showing an intake and exhaust system of an internal combustion engine having a vehicle air intake apparatus according to a first embodiment of the present invention.
Figure 2:
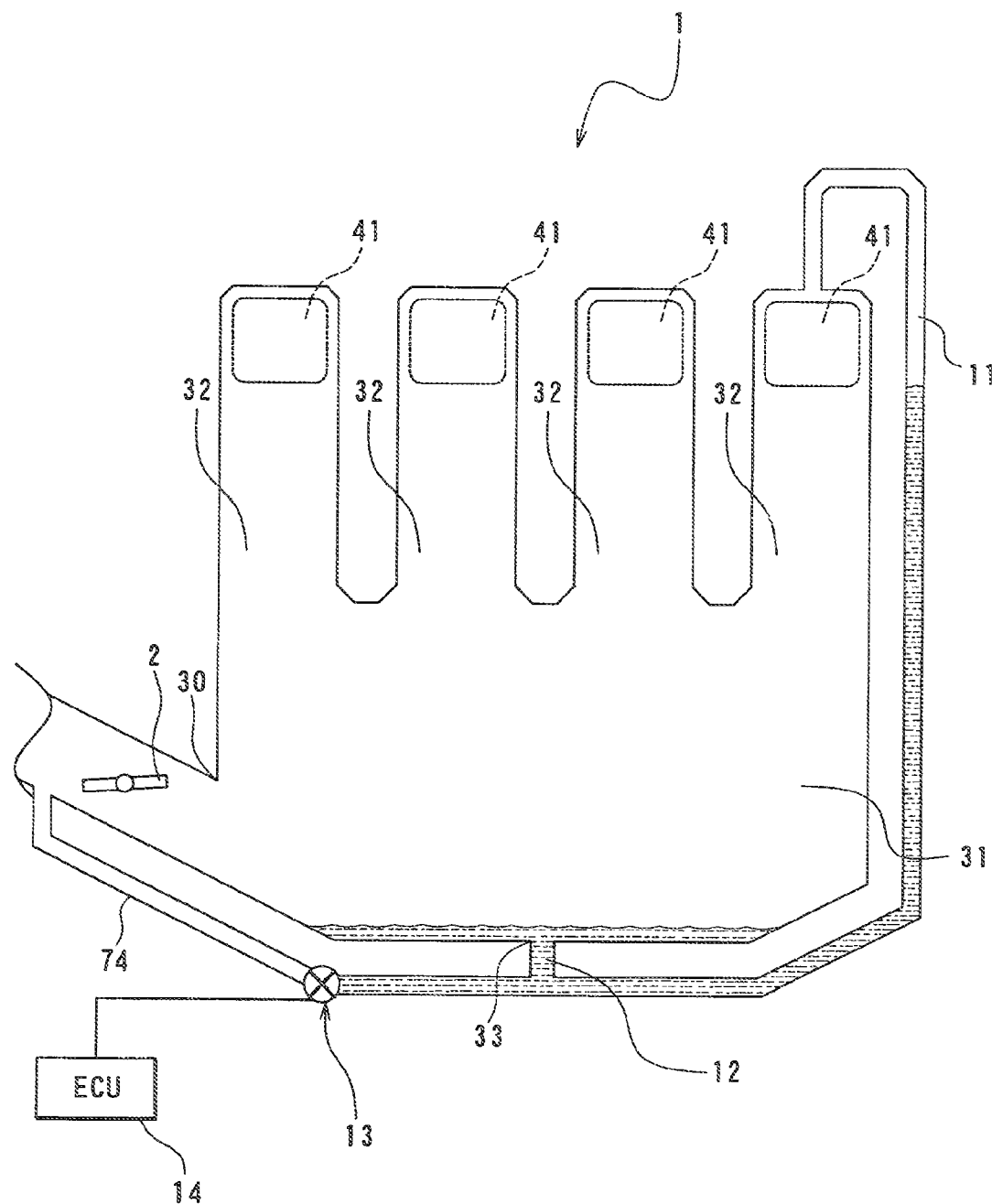
FIG. 2 is a schematic diagram showing the vehicle air intake apparatus of the first embodiment.

With reference to FIGS. 1 and 2, an air intake apparatus 1 of a vehicle according to a first embodiment of the present invention is placed in an intake passage 5 and includes a throttle valve 2 and an intake manifold 3. The throttle valve 2 adjusts a quantity of air supplied to cylinders of the engine 4. The intake manifold 3 is an intake distributing conduit, which distributes the adjusted air to the cylinders of the engine 4. The intake manifold 3 is placed on a downstream side of the throttle valve 2 in a flow direction of the intake air in the intake passage and includes a surge tank 31 and a plurality of intake branches 32. The surge tank 31 has an enlarged passage cross-sectional area, which is increased in comparison to that of a portion of the intake passage 5 that is adjacent to the surge tank 31 and is located on the upstream side of the surge tank 31. The intake branches 32 are placed on a downstream side of the surge tank 31 in the flow direction of the air in the intake passage and are connected to the cylinders, respectively, of the engine 4 to supply the adjusted air to the cylinders.

A lower edge of each connection between the surge tank 31 and a corresponding one of the intake branches 32 is placed on an upper side of a lower portion (bottom portion) of the surge tank 31. In this instance, an inlet 30 of the surge tank 31, through which the air is supplied from the throttle valve 2 to the interior of the surge tank 31, is placed in the lower portion of the surge tank 31, and the lower edge of each connection between the surge tank 31 and the corresponding one of the intake branches 32 is placed above the inlet 30 of the surge tank 31. However, the location of the inlet 30 of the surge tank 31 is not limited to the lower portion of the surge tank 31 and may be in any other portion (e.g., an upper portion) of the surge tank 31 as long as the lower edge of each connection between the surge tank 31 and the corresponding one of the intake branches 32 is placed on the upper side of the lower portion (bottom portion) of the surge tank 31.

The vehicle air intake apparatus 1 includes a communication conduit (also referred to as a communication passage) 11, a drain conduit 12, a switching valve 13 and a control device (an electronic control unit that is abbreviated as ECU) 14. The communication conduit 11 communicates between a portion of the intake passage, which is located on the upstream side of the throttle valve 2, and one of the intake branches 32 while bypassing the surge tank 31. The drain conduit 12 communicates between an outlet 33 of the lower portion of the surge tank 31 and the communication conduit 11. The switching valve 13 is placed in the communication conduit 11 to open or close the same on an upstream side of a connection of the communication conduit 11, at which the communication conduit 11 is connected to the drain conduit 12. Specifically, a rear end (downstream end) of a communication conduit upstream portion 74 is connected to the drain conduit 12 at a connection where the communication conduit upstream portion 74 is connected to an outlet of the drain conduit 12. The control device 14 controls opening and closing of the switching valve 13. Specifically, when the engine 4 is placed in one of an operational state in idling time of the vehicle (time of driving the engine 4 at an idling speed), an operational state in accelerating driving time of the vehicle (time of accelerating the vehicle) and an operational state in high speed driving time of the vehicle (time of driving the vehicle at a high speed with a high engine load on, for instance, an expressway), the control device 14 closes the switching valve 13. In contrast, when the engine 4 is placed in an operational state of decelerating driving time (time of decelerating the vehicle), the control device 14 opens the switching valve 13.

When the operational state of the engine 4 is in an intake stroke during the accelerating driving time or the high speed driving time (the state, in which the switching valve 13 of the communication conduit 11 is closed), the air is instantaneously expanded (adiabatically expanded) in the surge tank 31, which has the large passage cross-sectional area, so that the temperature of the air of the surge tank 31 decreases. Therefore, the water and/or oil contained in the intake air will be likely condensed as condensed fluid (liquid) in the surge tank 31. The condensed fluid of water and/or oil is guided to the lower portion of the surge tank 31 with aid of the gravitational force and is accumulated in the lower portion of the surge tank 31.

A downward urging force is exerted on a top fluid surface of the condensed fluid of water and/or oil, which is accumulated in the lower portion of the surge tank 31, due to a pressure difference between the surge tank 31 and the intake branches 32 (the pressure of the intake branches 32<the pressure of the surge tank 31) that is generated depending on a relationship of a distance from the cylinders of the engine 4 and a flow speed difference of the air. Because of this pressure difference between the surge tank 31 and the intake branch 32, the condensed fluid of water and/or oil accumulated in the lower portion of the surge tank 31 is urged, i.e., is forced toward the intake branch 32 side of the communication conduit 11 through the drain conduit 12.

When the switching valve 13 of the communication conduit 11 is opened at the time of operating the engine 4 in the decelerating driving time of the vehicle, the condensed fluid of water and/or oil in the communication conduit 11 can be pushed to, i.e., pumped to the intake branch 32 to reliably guide the fluid of water and/or oil to the cylinders of the engine 4 by utilizing the pressure difference between the pressure on the upstream side of the throttle valve 2 and the pressure on the downstream side of the throttle valve 2 (the pressure on the upstream side of the throttle valve 2>the pressure on the downstream side of the throttle valve 2, i.e., the pressure in the intake branch 32).

Now, the vehicle air intake apparatus 1 of the vehicle according to the first embodiment of the present invention will be described in detail with reference to FIGS. 1 and 2.

FIG. 1 is a schematic diagram showing the structure of the intake and exhaust system of the engine 4, which includes the vehicle air intake apparatus 1 of the first embodiment. The engine 4 of the present embodiment is a vehicle drive engine (automobile drive engine) and is provided with the intake passage (intake conduit) 5 and an exhaust passage (exhaust conduit) 6. The intake passage 5 guides the intake air to the cylinders of the engine 4. The exhaust passage 6 guides the exhaust gas generated in the cylinders to the outside atmosphere.

An air cleaner 51, a compressor 52 of a turbocharger and an intercooler 53 are provided in a portion of the intake passage 5, which is located between an external air inlet opening of the intake passage 5 and the vehicle air intake apparatus 1. The air cleaner 51 removes dust and debris contained in the intake air. The intercooler 53 forcefully cools the intake air, which has been compressed by the compressor 52 and thereby becomes hot.

The intake manifold 3 is the intake distributing pipe that distributes the air, which is supplied from the intake passage 5, to the cylinders of the engine 4. As discussed above, the intake manifold 3 includes the surge tank 31 and the intake branches 32. The surge tank 31 has the enlarged passage cross-sectional area and reduces the intake pulsation and the intake interference. The intake branches 32 distribute the air from the surge tank 31 to the cylinders of the engine 4.

In a cylinder head of the engine 4, intake ports 41 are formed for the cylinders, respectively, of the engine 4 and are connected to the intake branches 32, respectively. In the first embodiment, the communication conduit 11 is communicated with the one of the intake branches 32.

In the cylinder head of the engine 4, the intake valves are provided to the cylinders, respectively, and the exhaust valves are also provided to the cylinders, respectively.

In each cylinder of the engine 4, an intake stroke, a compression stroke, an expansion stroke (combustion stroke) and an exhaust stroke are repeated one after another. The intake valve is opened at the beginning of the intake stroke (at the start of increasing of the cylinder volume caused by a downward movement of a piston). The intake valve is closed at the end of the intake stroke (at the end of the increasing of the cylinder volume caused by the downward movement of the piston). The flow of the air, which is directed from the fresh air inlet toward the cylinders of the engine 4, is created by the intake stroke of the engine 4.

The exhaust valve is opened at the beginning of the exhaust stroke (at the start of decreasing of the cylinder volume caused by an upward movement of the piston). The exhaust valve is closed at the end of the exhaust stroke (at the end of the decreasing of the cylinder volume caused by the upward movement of the piston). Due to this exhausting operation of the engine 4, a flow of the exhaust gas, which is directed from the cylinder of the engine 4, toward an exhaust gas outlet is created.

An exhaust manifold, an exhaust turbine 62 of the turbocharger and an exhaust filter 61 are arranged in the exhaust passage 6. The exhaust manifold is an exhaust collecting conduit, which collects the exhaust gas outputted from the cylinders. The exhaust turbine 62 is placed on the downstream side of the exhaust manifold. The exhaust filter 61 is placed on the downstream side of the exhaust turbine 62.

The intake and exhaust system of the engine 4 shown in FIG. 1 includes an exhaust gas recirculation (EGR) apparatus, which recirculates a portion of the exhaust gas from the exhaust passage 6 to the intake passage 5 as EGR gas.

The exhaust recirculation apparatus includes an EGR passage 65, art EGR cooler 63 and an EGR valve 64. The EGR passage 65 communicates between a downstream side of the exhaust filter 61 in a flow direction of the exhaust gas in the exhaust passage and an upstream side of the compressor 52 of the turbocharger in a flow direction of the air in the intake passage. The EGR cooler 63 is placed in the EGR passage 65 and forcefully cools the high temperature EGR gas. The EGR valve 64 is placed in the EGR passage 65 on the downstream side of the EGR cooler 63 in the EGR passage 65 to control the flow quantity of the EGR gas.

In the intake and exhaust system of the engine 4 of the first embodiment, which includes the EGR apparatus, the air to be supplied to the cylinders contains the EGR gas, which includes the larger quantity of water and oil in comparison to an intake and exhaust system of an engine that does not have such an EGR apparatus. Therefore, the supplied air (more specifically, the supplied gas containing the air and the EGR gas), which is supplied into the surge tank 31, instantaneously expands (adiabatically expands), so that the temperature of the supplied air decreases to likely cause condensation of the water and/or oil contained in the supplied air.

The condensed fluid, which includes the condensed water and/or oil, is guided to the lower portion of the surge tank 31 due to the presence of the gravitational force and is accumulated in the lower portion of the surge tank 31.

In the case where the lower edge of the connection between the surge tank 31 and the intake branch 32 is placed on the upper side of the lower portion of the surge tank 31, the accumulated fluid, which includes the water and/or oil, cannot be guide to the cylinder of the engine 4 through the intake branches 32.

In view of such a disadvantage, the vehicle air intake apparatus 1 of the first embodiment includes the communication conduit 11 that guides the condensed fluid, which includes the water and/or oil, to the cylinder of the engine 4.

The communication conduit 11 communicates between the portion of the intake passage, which is located on the upstream side of the throttle valve 2 in the flow direction of the air in the intake passage, and the one of the intake branches 32 while bypassing the surge tank 31. The switching valve 13 is placed in the communication conduit 11 at the corresponding location on the upstream side of the connection of the communication conduit 11, at which the communication conduit 11 is connected to the drain conduit 12 that is in turn connected to the lower portion (bottom portion) of the surge tank 31 through the outlet 33. The control device 14 controls opening and closing of the switching valve 13.

The control device 14 is the electronic control unit (ECU), which controls the engine system and has a microcomputer of a known structure, which includes a CPU, a storage device (a memory such as a ROM, a RAM), an input circuit and an output circuit. The CPU executes various arithmetic computing processes. The storage device stores various programs and data.

According to the first embodiment, when the engine 4 is placed in one of the operational state in the idling time of the vehicle, the operational state in the accelerating driving time of the vehicle and the operational state in the high speed driving time of the vehicle, the control device 14 closes the switching valve 13. In contrast, when the engine 4 is placed in the operational state in the decelerating driving time of the vehicle, the control device 14 opens the switching valve 13.

Specifically, in the vehicle air intake apparatus 1 of the first embodiment, when the operational state of the engine 4 is in the intake stroke during the accelerating driving time or the high speed driving time, the downward urging force, which is directed toward the lower side of the surge tank 31, is exerted on the top fluid surface of the condensed fluid of water and/or oil, which is accumulated in the lower portion of the surge tank 31, due to the presence of the pressure difference (differential pressure). This pressure difference is created by the pressure difference between each intake branch 32, which is closer to the corresponding cylinder of the engine 4, and the surge tank 31 (the pressure of the intake branch 32<the pressure of the surge tank 31), and the pressure difference (the pressure of the intake branch 32<the pressure of the surge tank 31) generated by the difference between the flow velocity of the air in the surge tank 31, which has the larger intake passage cross-sectional area in comparison to the other part, and the flow velocity of the air in the intake branch 32, which has the smaller intake passage cross-sectional area in comparison to the surge tank 31 (the flow velocity of the air in the intake branch 32>the flow velocity of the air in the surge tank 31). Thereby, the condensed fluid of water and/or oil, which is accumulated in the lower portion of the surge tank 31, is pushed by the pressure difference (differential pressure) between the surge tank 31 and the intake branch 32, toward the intake branch 32 side of the communication conduit 11 through the drain conduit 12.

Then, when the operational state of the engine 4 is changed to the operational state in the decelerating driving time, the control device 14 places the switching valve 13 of the communication conduit 11 into the open state thereof. Thereby, the fluid of water and/or oil in the communication conduit 11 can be pushed to, i.e., pumped to the intake branch 32 by utilizing the pressure difference (differential pressure) generated between the upstream side of the throttle valve 2 and the downstream side (the intake branch 32) of the throttle valve 2 (the pressure on the upstream side of the throttle valve 2>the pressure on the downstream side of the throttle valve 2). In this way, the fluid of water and/or oil can be reliably conducted to the cylinder of the engine 4.

Furthermore, when the engine 4 is placed in one of the operational state in the idling time, the operational state in the accelerating driving time and the operational state in the high speed driving time, the control device 14 performs the closing control operation to close the switching valve 13 of the communication conduit 11, which bypasses the throttle valve 2. In this way, when the engine 4 is placed in the one of the operational state in the idling time, the operational state in the accelerating driving time and the operational state in the high speed driving time, the communication conduit 11 does not have the flow of the air, which bypasses the throttle valve 2. Therefore, it will not have a substantial influence on the air quantity control operation, which controls the quantity of the air supplied to the cylinders of the engine 4.

Second Embodiment

A second embodiment of the present invention, which is a modification of the first embodiment, will be described with reference to FIG. 3. In each of the following embodiments, the components, which are similar to those of the first embodiment, will be indicated by the same reference numerals and will not be described again for the sake of simplicity.

In the second embodiment, a check valve 15 is placed in the drain conduit 12. The check valve 15 enables the flow of the fluid (air, i.e., gas or liquid) only from the surge tank 31 to the communication conduit 11 in the drain conduit 12 and disables the flow of the fluid from the communication conduit 11 to the surge tank 31 in the drain conduit 12.

As in the present embodiment, when the drain conduit 12 is provided with the check valve 15, which enables the flow of the fluid in the drain conduit 12 only from the surge tank 31 to the communication conduit 11, it is possible to limit a backflow of the fluid of water and/or oil into the surge tank 31 by the pressure difference (differential pressure) between the upstream side of the throttle valve 2 and the surge tank 31, i.e., the downstream side of the throttle valve 2 (the pressure of the upstream side of the throttle valve 2>the pressure of the surge tank 31).

Third Embodiment

A third embodiment of the present invention, which is a modification of the first embodiment, will be described with reference to FIG. 4.

In the third embodiment, the switching valve 13 serves as a first switching valve, and a second switching valve 16, which opens or closes the drain conduit 12, is provided in the drain conduit 12. The control device 14 executes the control operation of the second switching valve 16 as follows. That is, the control device 14 opens the second switching valve 16 in the state where the switching valve 13 is closed, and the control device 14 closes the second switching valve 16 in the state where the switching valve 13 is opened.

When the second switching valve 16 is controlled in this manner, the second switching valve 16 is closed at the time of opening the switching valve 13 provided in the communication conduit 11, and thereby the downstream portion of the drain conduit 12, which is on the downstream side of the second switching valve 16, and the surge tank 31 are not communicated with each other. As a result, it is possible to limit the backflow of the fluid of water and/or oil, which remains in the drain conduit 12, into the surge tank 31.

Fourth Embodiment

Figure 5:
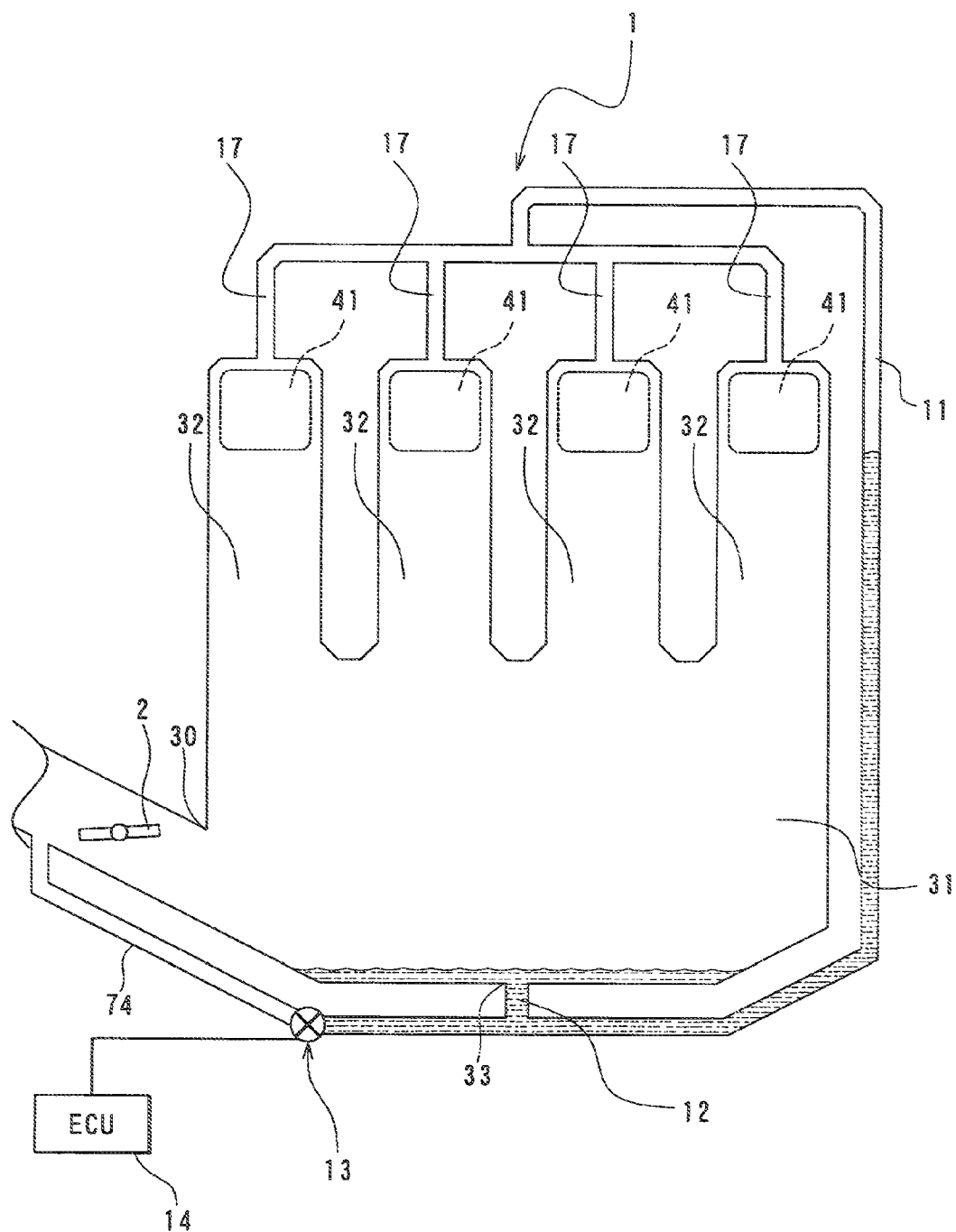
FIG. 5 is a schematic diagram showing a vehicle air intake apparatus according to a fourth embodiment of the present invention.

A fourth embodiment of the present invention, which is a modification of the first embodiment, will be described with reference to FIG. 5.

In the fourth embodiment, distributing conduits 17, which distribute the fluid of water and/or oil to the intake branches 32, respectively, are provided to the communication conduit 11.

When the condensed fluid of water and/or oil is distributed to the intake branches 32 in this manner, it is possible to avoid a disadvantage, which could be induced by supplying the large quantity of the condensed fluid of water and/or oil into the particular one of the cylinders of the engine 4 at once. Therefore, it is possible to limit the water hammering phenomenon and/or the generation of white smoke caused by combustion of the oil in the combustion stroke of the engine.

Fifth Embodiment

Figure 6:
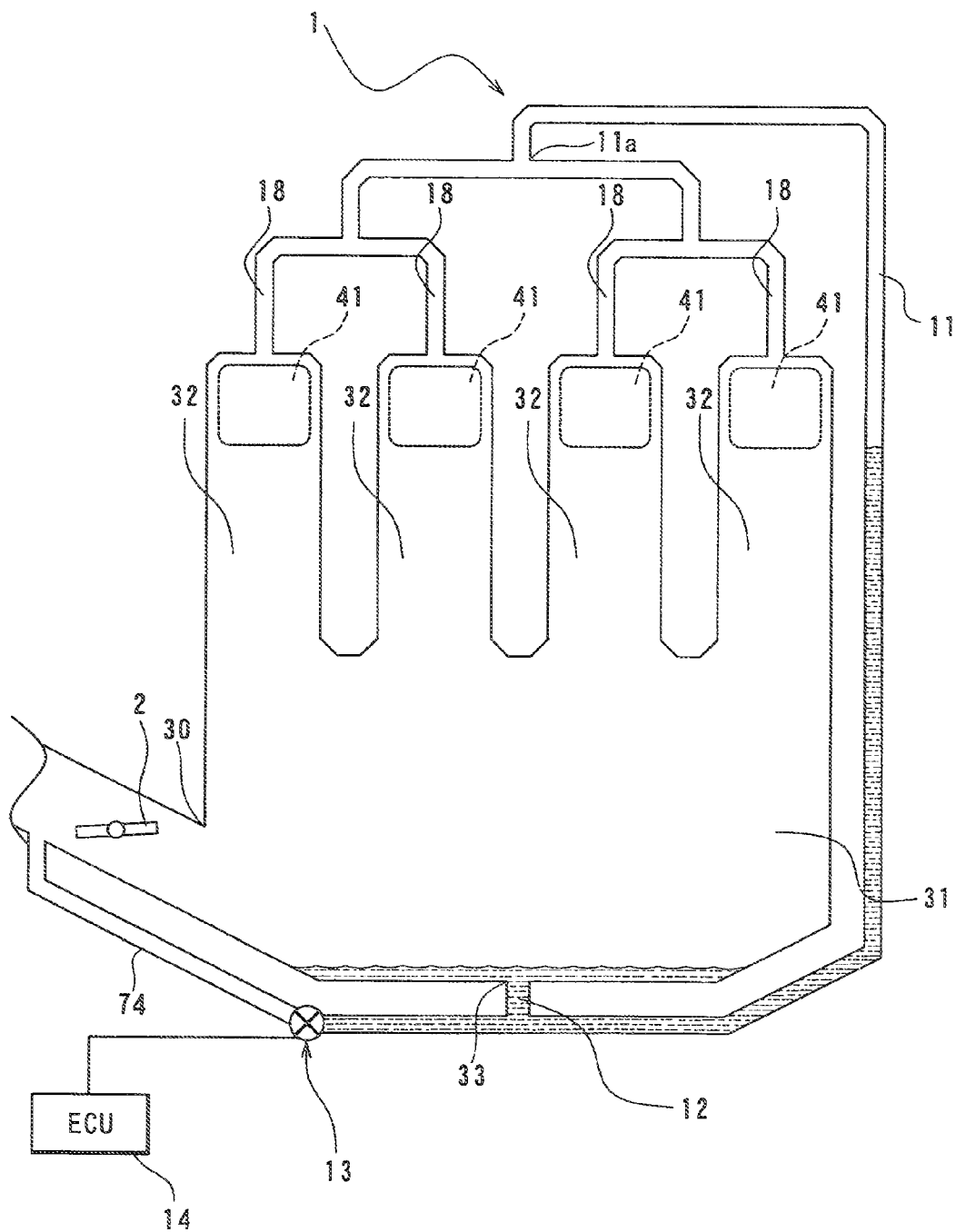
FIG. 6 is a schematic diagram showing a vehicle air intake apparatus according to a fifth embodiment of the present invention.

A fifth embodiment of the present invention, which is a modification of the first embodiment, will be described with reference to FIG. 6.

In the fifth embodiment, a plurality of distributing conduits 18 is provided to the communication conduit 11 to distribute the fluid of water and/or oil to the intake branches 32 such that a distance (passage length) from a branch start point 11a of the communication conduit 11 (i.e., an end of the single unbranched passage of the communication conduit 11), from which the distributing conduits 18 are branched, to each of the intake branches 32 is made generally constant for all of the distributing conduits 18. Furthermore, a passage cross-sectional area is generally the same for all of the distributing conduits 18 from the branch start point 11a of the communication conduit 11 to the corresponding one of the intake branches 32.

When the passage cross-sectional area of each of the distributing conduits 18 and the length from the branch start point 11a of the communication conduit 11 to the corresponding one of the intake branches 32 are made generally constant, the condensed fluid of water and/or oil can be generally uniformly distributed to the cylinders of the engine 4. Thereby, it is possible to limit the water hammering phenomenon and/or the generation of white smoke.

Sixth Embodiment

Figure 7:
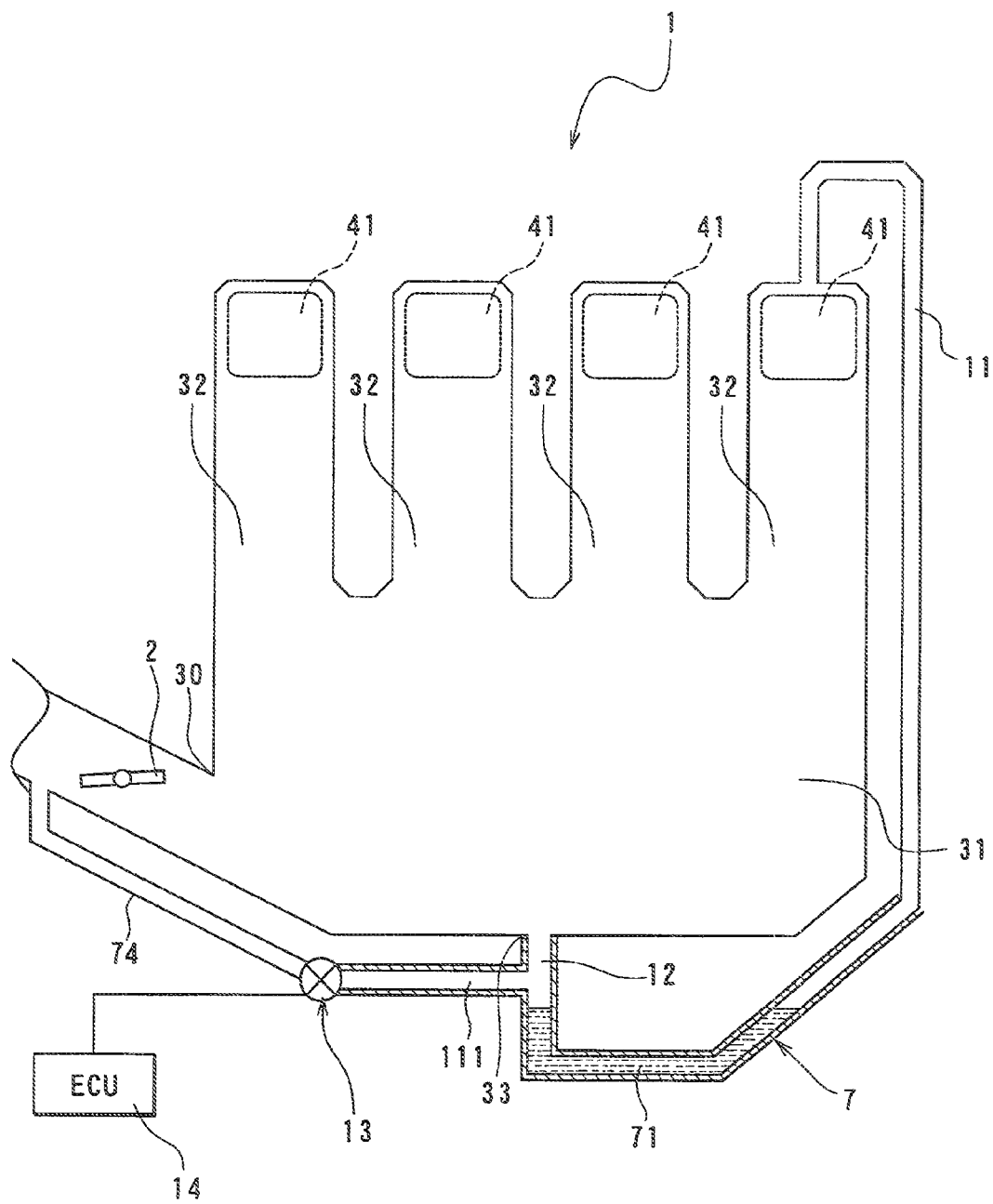
FIG. 7 is a schematic diagram showing a vehicle air intake apparatus according to a sixth embodiment of the present invention.

A sixth embodiment of the present invention, which is a modification of the first embodiment, will be described with reference to FIG. 7.

in the sixth embodiment, a volume portion (condensed fluid storage chamber) 7 is provided in an upstream side portion of the communication conduit 11, which is located on the lower side of the surge tank 31 and is closer to the drain conduit 12 than to the intake branches 32. The volume portion 7 is adapted to temporarily receive and store the condensed fluid of water and/or oil. The volume portion 7 of the sixth embodiment includes (or is configured into) a U-shaped conduit 71, which is configured into a generally U-shape and is formed by downwardly extending the drain conduit 12 and then laterally (horizontally) extending this downwardly extended portion to connect with a downstream side portion of the communication conduit 11. The volume portion 7 (the U-shaped conduit 71) is placed on the lower side of the drain conduit 12 and is also placed on the lower side of a communication pipe (communication path) 111, which extends from the switching valve 13 to the drain conduit 12 in the communication conduit upstream portion 74. Furthermore, it is desirable that a volume of the U-shaped conduit 71 (the volume portion 7) is set to be larger than a volume of the condensed fluid (the fluid of water and/or oil), which is generated during an interval of purging (a process of drawing the fluid of water and/or oil into the cylinder of the engine 4) in all of the normal operational conditions.

Figure 3:
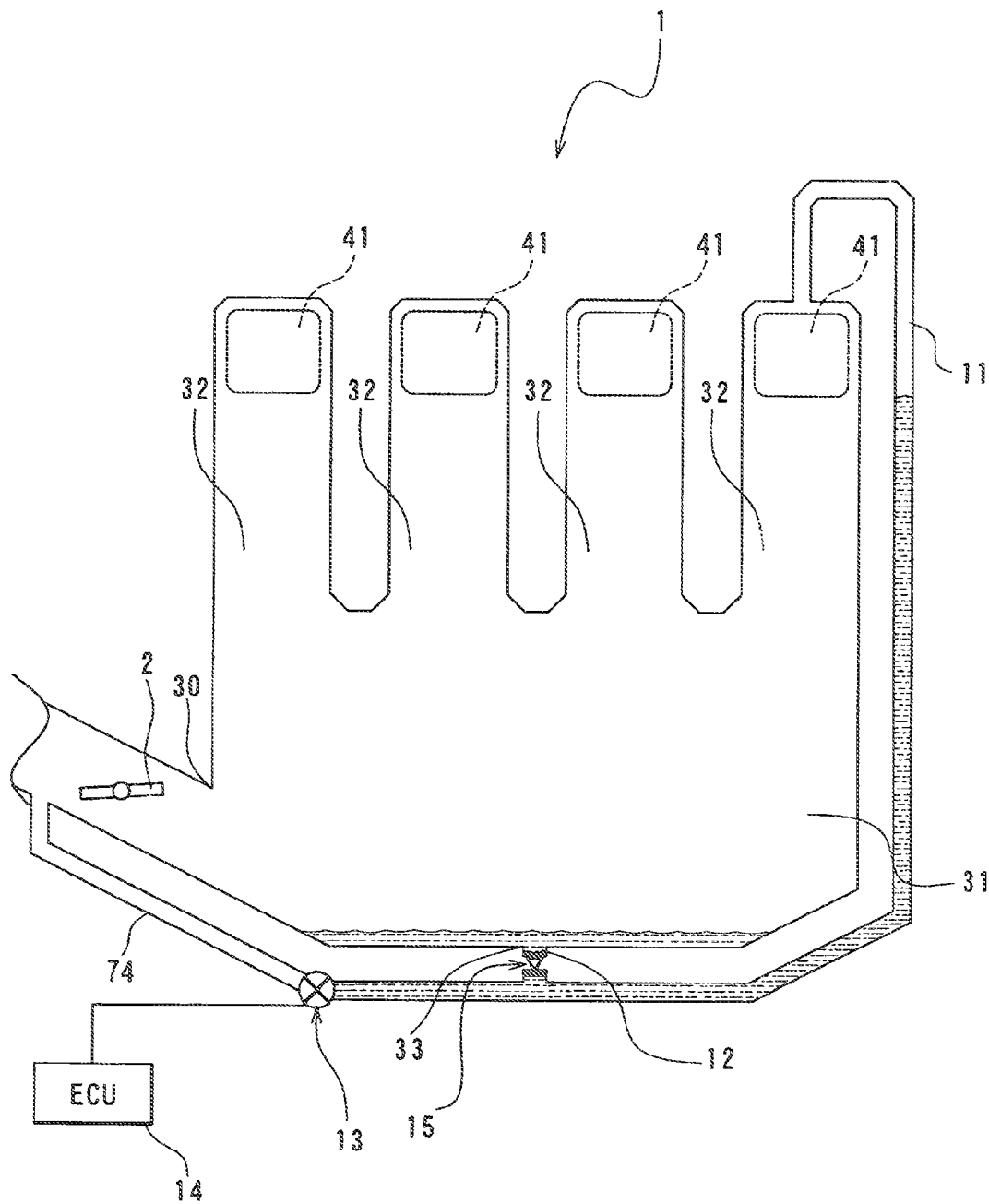
FIG. 3 is a schematic diagram showing a vehicle air intake apparatus according to a second embodiment of the present invention.
Figure 4:
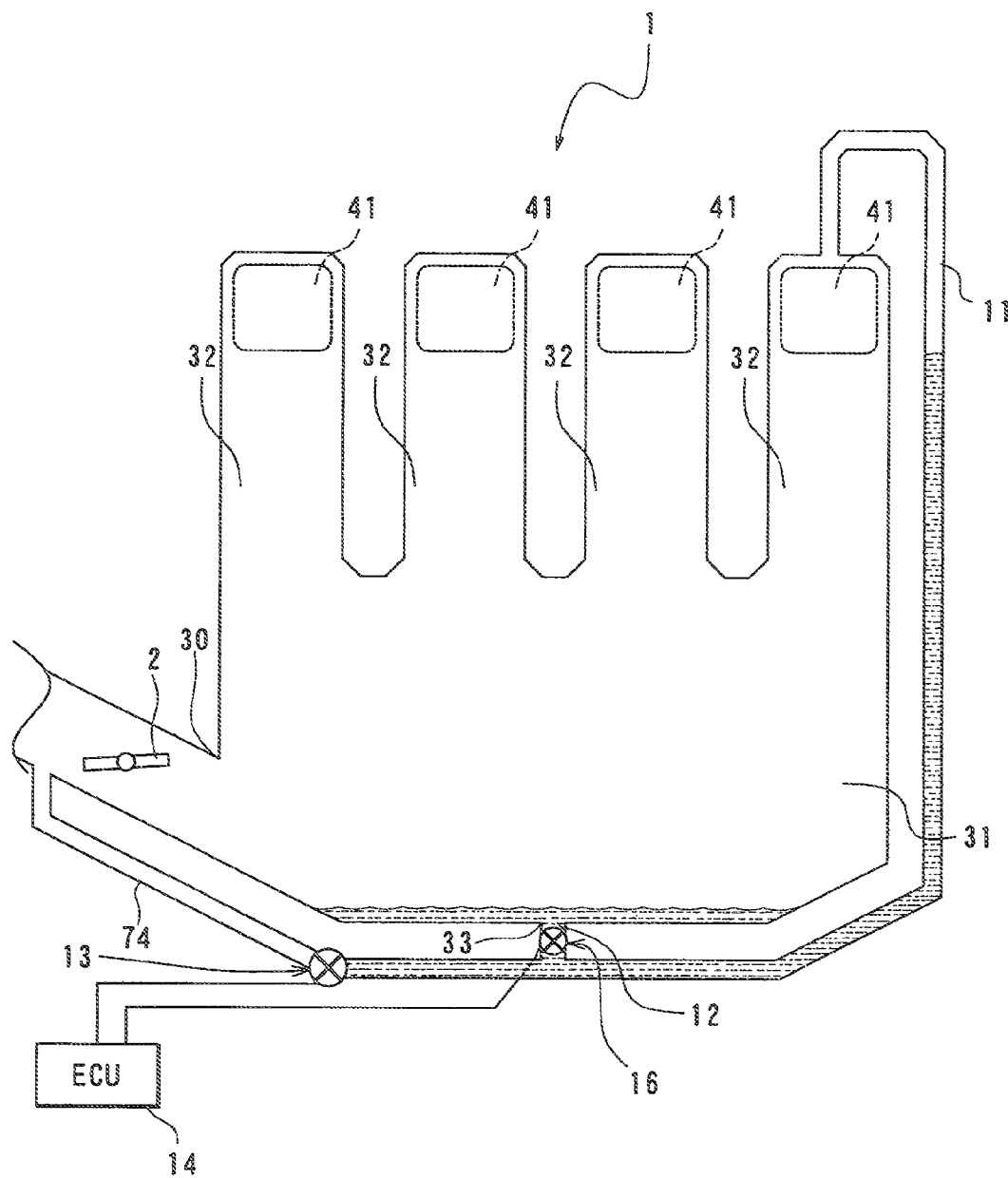
FIG. 4 is a schematic diagram showing a vehicle air intake apparatus according to a third embodiment of the present invention.

When the U-shaped conduit 71 is provided in this manner, it is possible to limit the backflow of the condensed fluid of water and/or oil contained in the drain conduit 12 into the surge tank 31 without a need for providing the check valve 15 of FIG. 3 or the second switching valve 16 of FIG. 4. That is, the provision of the U-shaped conduit 71 can limit the backflow of the fluid of water and/or oil in the drain conduit 12 at the low costs. The placement of the volume portion 7 on the lower side of the drain conduit 12 or the communication pipe 111 and the setting of the volume of the volume portion 7 (the U-shaped conduit 71) to be larger than the quantity (volume) of the condensed fluid, which is generated during the interval of the purging, are made to reliably limit the backflow of the condensed fluid.

Seventh Embodiment

Figure 8:
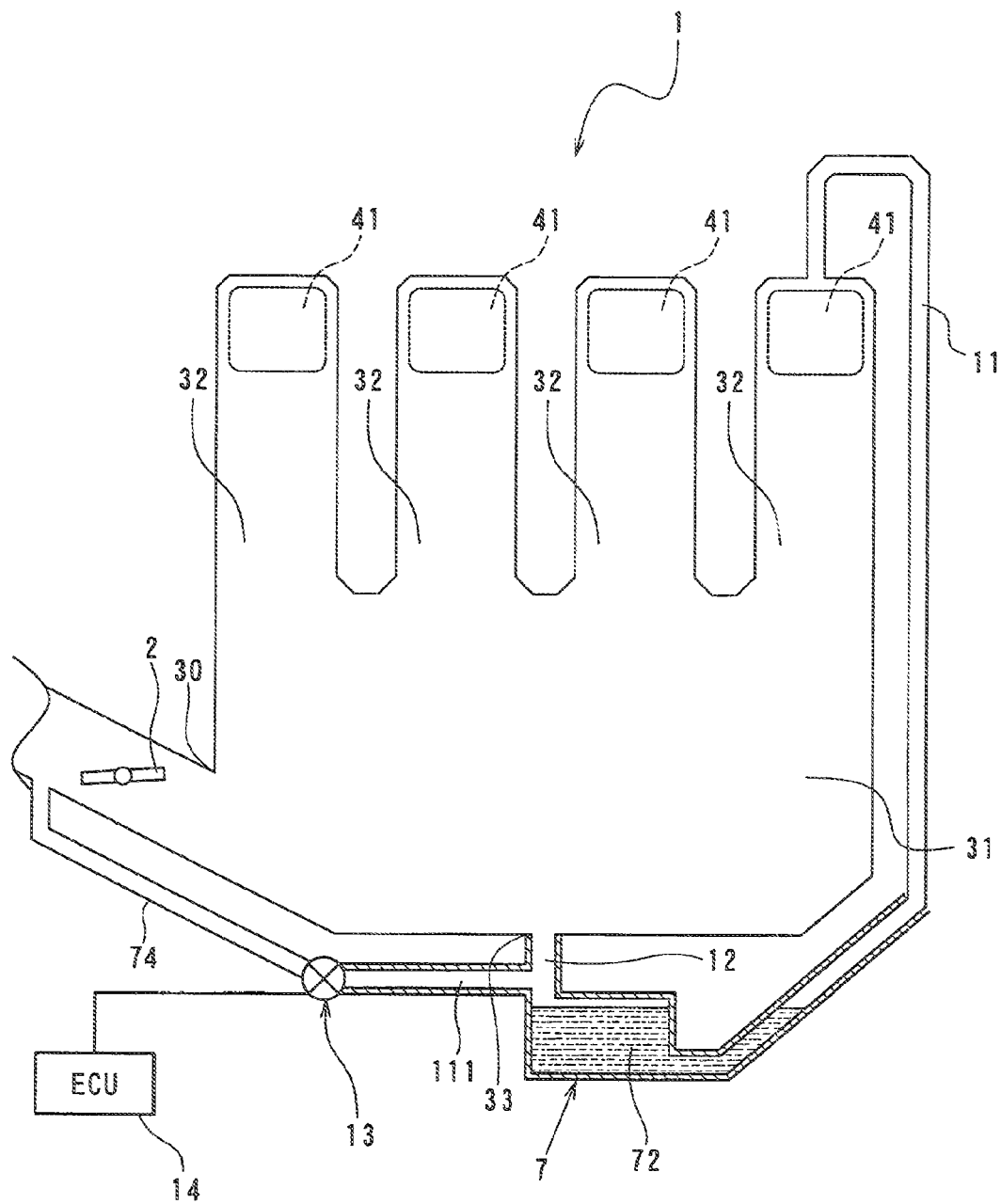
FIG. 8 is a schematic diagram showing a vehicle air intake apparatus according to a seventh embodiment of the present invention.

A seventh embodiment of the present invention, which is a modification of the sixth embodiment, will be described with reference to FIG. 8.

In this embodiment, the volume portion 7 includes (or is configured into) a tank portion 72 that has an inner diameter (or a cross-sectional area), which is larger than an inner diameter (or a cross-sectional area) of the communication conduit 11 and of the drain conduit 12. The tank portion 72 is placed on the lower side of the communication pipe 111 between the switching valve 13 and the drain conduit 12 and also on the lower side of the drain conduit 12 and has an upper part, which is connected to a lower end of the drain conduit 12. A lower part (bottom part) of the tank portion 72 is communicated with the downstream side portion of the communication conduit 11. Furthermore, it is desirable that a volume of the tank portion 72 is set to be larger than a volume (quantity) of the condensed fluid (the fluid of water and/or oil), which is generated during the interval of purging (the process of drawing the fluid of water and/or oil into the cylinders of the engine 4) in all of the normal operational conditions. Alternatively, the tank portion 72 may be made by enlarging the inner diameter (or the cross-sectional area) of the communication conduit 11 or may be made separately from the communication conduit 11.

When the tank portion 72 is provided in this manner, it is possible to limit the backflow of the condensed fluid of water and/or oil contained in the drain conduit 12 into the surge tank 31 without a need for providing the check valve 15 of FIG. 3 or the second switching valve 16 of FIG. 4. With this construction, it is possible to limit the backflow of the condensed fluid of water and/or oil contained in the drain conduit 12 at the low costs. In the present embodiment, the tank portion 72 is placed on the lower side of the drain conduit 12 or the communication pipe 111, and the volume of the tank portion 72 is set to be larger than the volume (the quantity) of the condensed fluid generated during the interval of purging. This setting is made to reliably limit the backflow of the condensed fluid.

Eighth Embodiment

An eighth embodiment of the present, which is a modification of the sixth embodiment, invention will be described with reference to FIG. 9.

In this embodiment, the volume portion 7 includes (or is configured into) the U-shaped conduit 71, which is placed in the upstream side portion of the communication conduit 11, and tank portion 72, which is similar to the tank portion 72 of the seventh embodiment and is placed on the upstream side and on the upper side of the U-shaped conduit 71. The U-shaped conduit 71 and the tank portion 72 are placed on the lower side of the drain conduit 12 and also on the lower side of the communication pipe 111 between the switching valve 13 and the drain conduit 12. Furthermore, it is desirable that a total volume of the U-shaped conduit 71 and the tank portion 72 is set to be larger than the volume (quantity) of the condensed fluid (the fluid of water and/or oil), which is generated during the interval of purging (the process of drawing the fluid of water and/or oil into the cylinder of the engine 4) in all of the normal operational conditions.

When the U-shaped conduit 71 and the tank portion 72 are provided in this manner, it is possible to limit the backflow of the condensed fluid of water and/or oil contained in the drain conduit 12 into the surge tank 31 without a need for providing the check valve 15 of FIG. 3 or the second switching valve 16 of FIG. 4. In the present embodiment, the U-shaped conduit 71 and the tank portion 72 are placed on the lower side of the drain conduit 12 or the communication pipe 111, and the total volume of the U-shaped conduit 71 and the tank portion 72 are set to be larger than the volume (the quantity) of the condensed fluid generated during the interval of purging. This setting is made to reliably limit the backflow of the condensed fluid. Furthermore, in the present embodiment, the tank portion 72 is provided in addition to the U-shaped conduit 71. Therefore, even when a large quantity of the condensed fluid (the condensed fluid of water and/or oil) is generated due to some reason, the backflow of the condensed fluid can be reliably limited.

Figure 10:
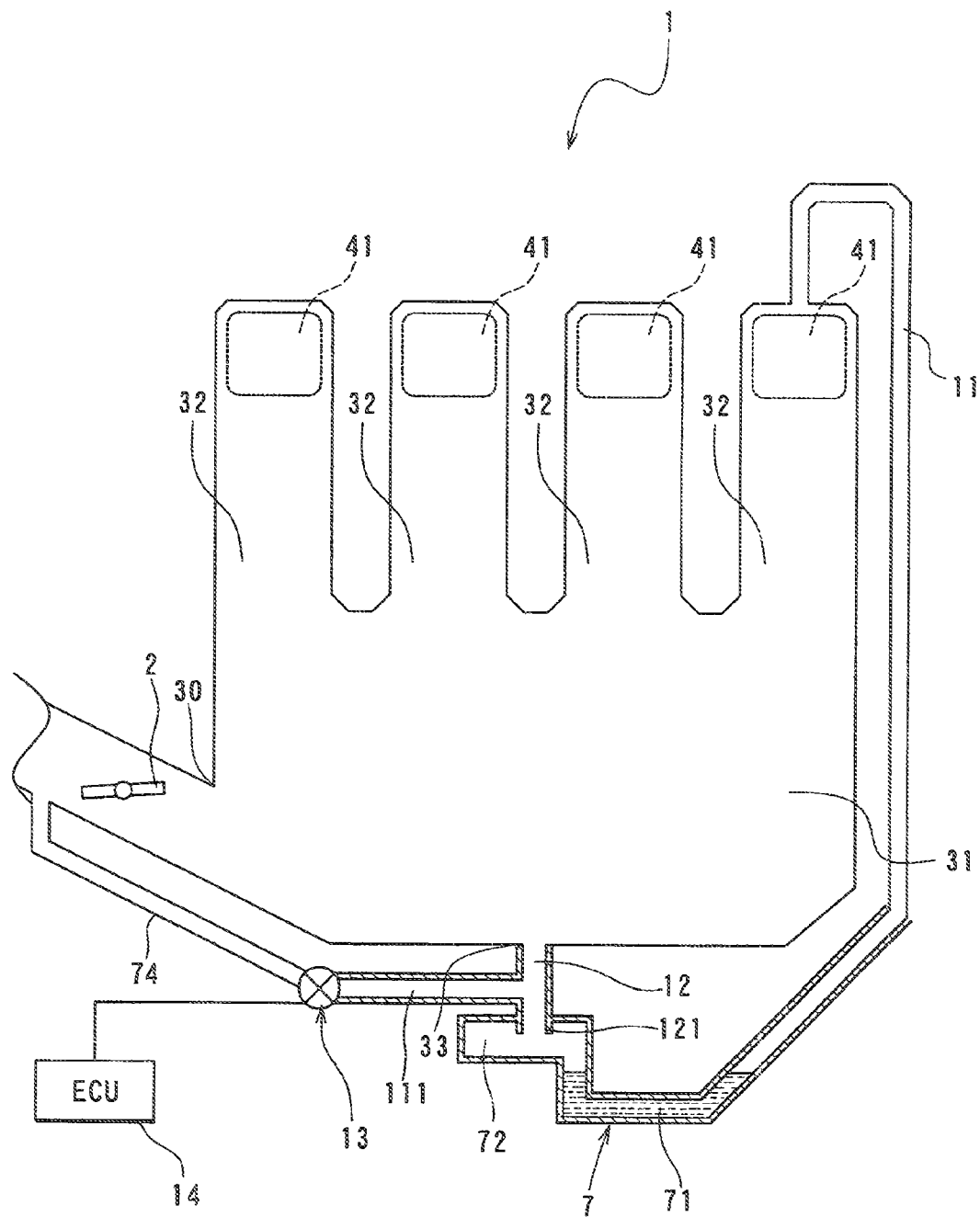
FIG. 10 is a schematic diagram showing a modification of the eighth embodiment shown in FIG. 9.

A modification of the eighth embodiment will be described with reference to FIG. 10.

Figure 9:
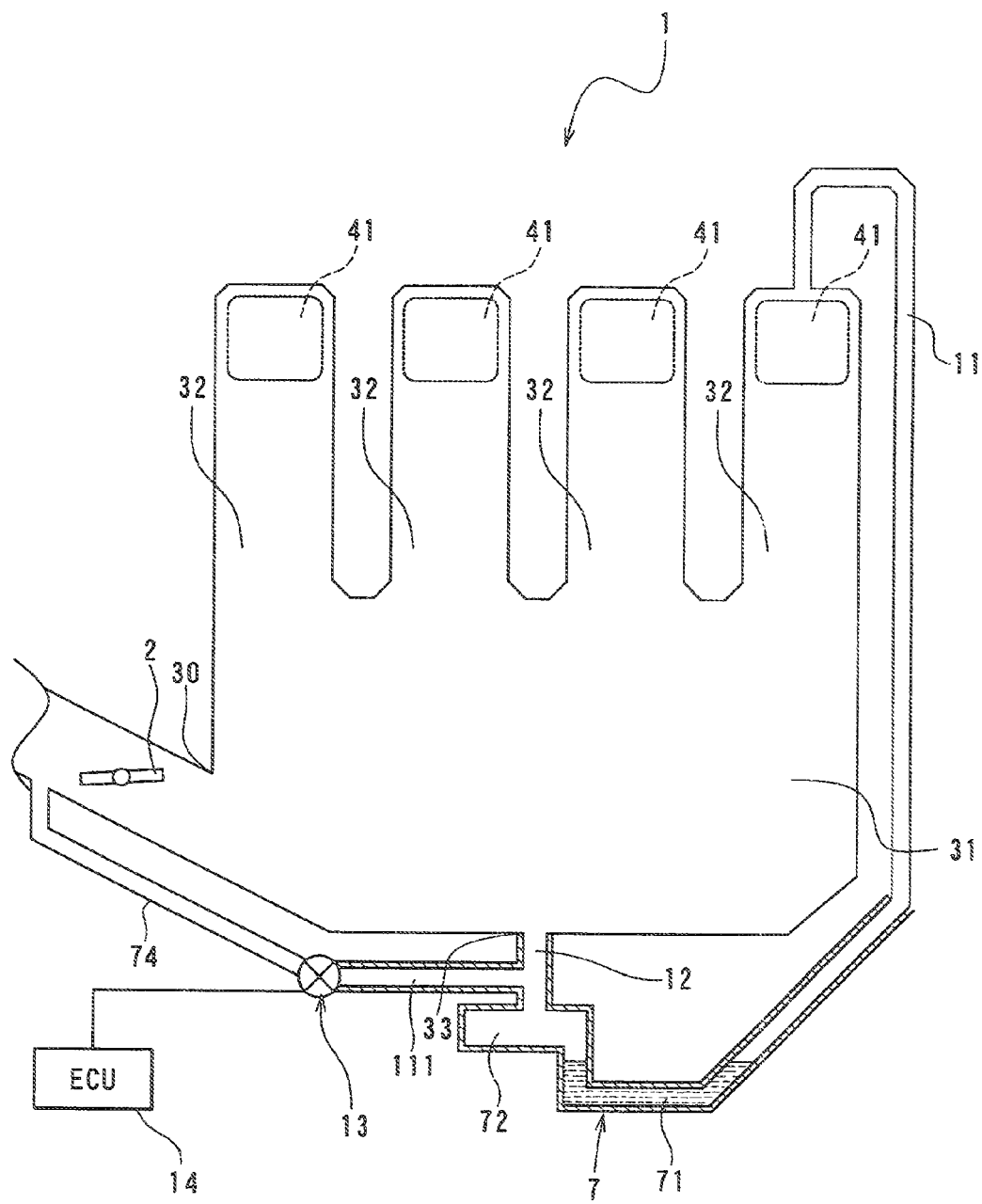
FIG. 9 is a schematic diagram showing a vehicle air intake apparatus according to an eighth embodiment of the present invention.

In this modification, a lower end 121 of the drain conduit 12 shown in FIG. 9 projects downward from an inlet of the tank portion 72. In this way, even when the condensed fluid (the condensed fluid of water and/or oil), which is accumulated in the U-shaped conduit 71 or the tank portion 72, is swung or agitated due to vibrations of the engine or of the vehicle or tilting of the vehicle, it is possible to further limit the backflow of the condensed fluid into the surge tank 31.

Ninth Embodiment

Figure 11:
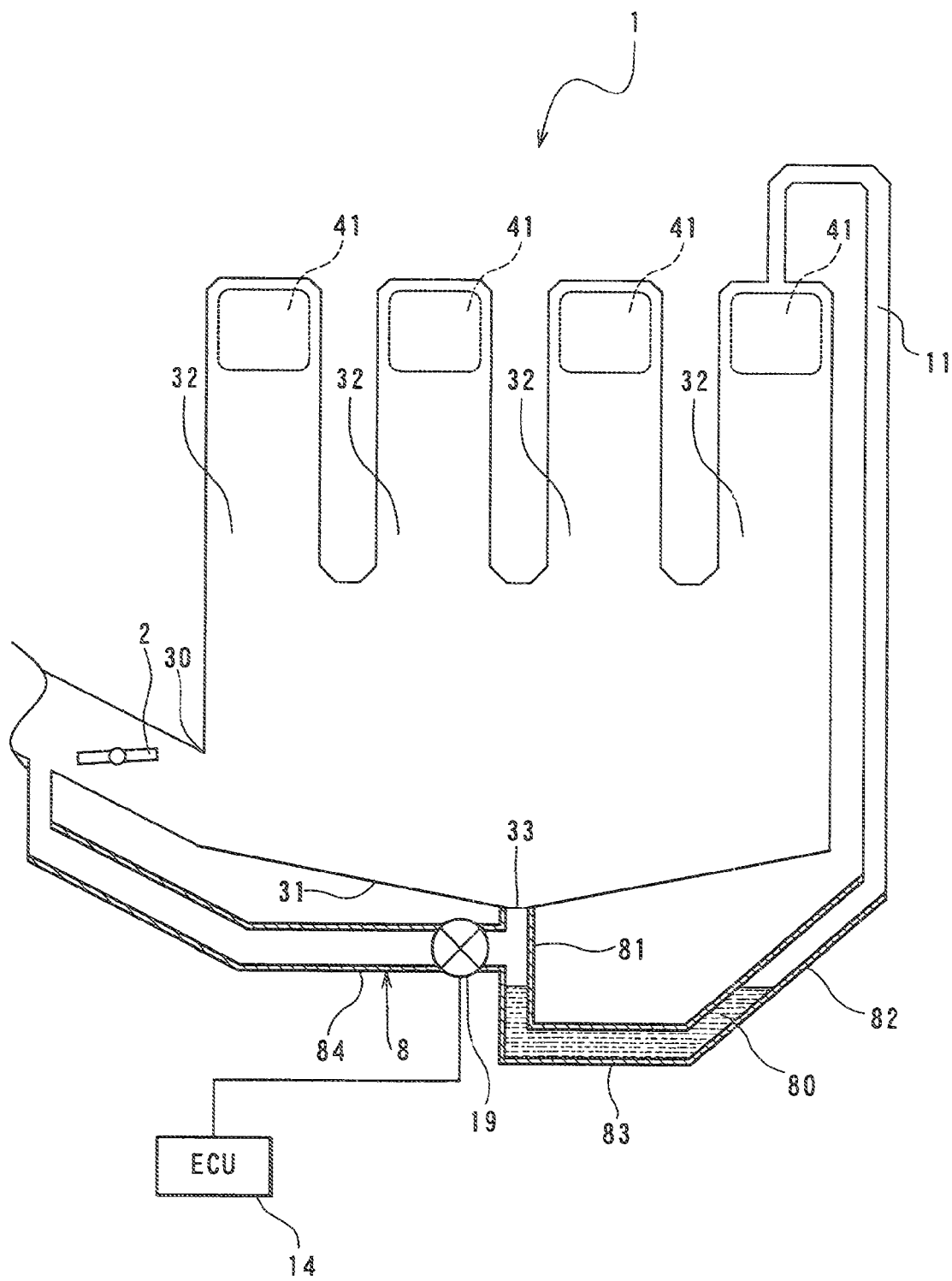
FIG. 11 is a schematic diagram showing a vehicle air intake apparatus according to a ninth embodiment of the present invention.
Figure 17A:
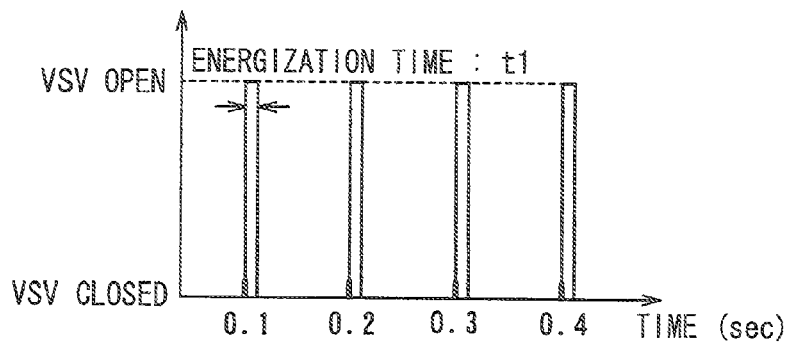
FIG. 17A is a diagram showing a change in voltage with time in a duty control operation of energization of a switching valve during a decelerating driving time according to the ninth embodiment of the present invention.
Figure 17B:
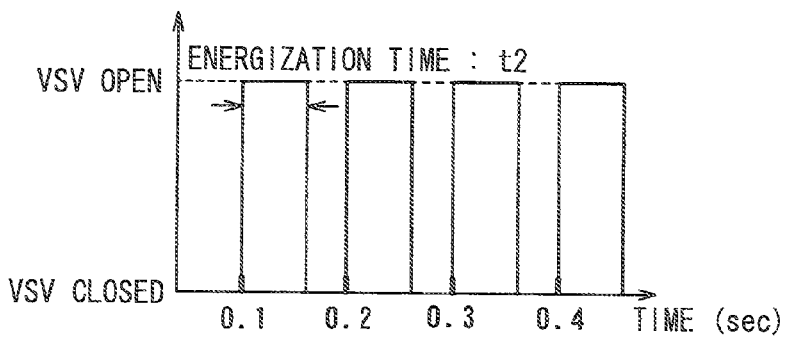
FIG. 17B is a diagram showing a change in voltage with time in a duty control operation of energization of the switching valve during a normal driving time according to the ninth embodiment of the present invention.
Figure 18:
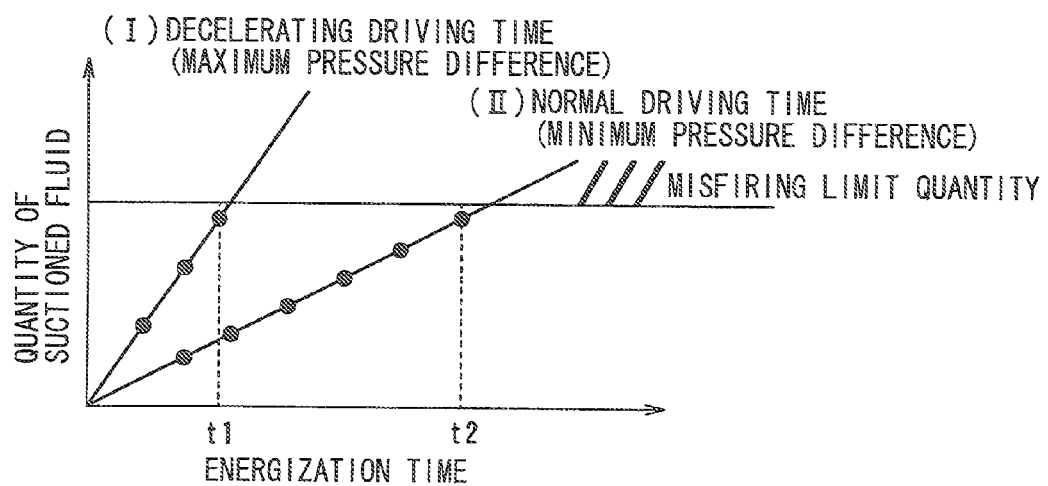
FIG. 18 is a diagram showing a relationship between a change in a quantity of suctioned fluid per opening of the switching valve and energization time for energizing the switching valve according to the ninth embodiment.

A vehicle air intake apparatus according to a ninth embodiment of the present invention will be described with reference to FIGS. 11, 17 and 18.

In the vehicle air intake apparatus of the ninth embodiment, a condensed fluid storage chamber (also referred to as a U-shaped conduit) 83 of a generally U-shaped form is formed to include a communication conduit drain portion (communication passage drain portion) 81 and a communication conduit downstream portion (communication passage downstream portion) 82 and is placed on the lower side of the surge tank 31. The communication conduit drain portion 81 extends downward in the direction of gravity (vertical direction) from the outlet 33 of the lower portion of the surge tank 31. The communication conduit downstream portion 82 extends in the horizontal direction for a predetermined length from a lower end of the communication conduit drain portion 81 and then extends obliquely upward. The upper part of the communication conduit drain portion 81, which extends from the outlet 33 of the lower portion of the surge tank 31, may serve as a drain conduit, which is similar to the drain conduit 12 of the first embodiment. Also, the condensed fluid storage chamber 83 may serve as a volume portion, which is similar to the volume portion 7 of the sixth embodiment.

A rear end (downstream end) of a communication conduit upstream portion (communication passage upstream portion) 84 is connected to an uppermost part (upper part) of the communication conduit drain portion 81.

Furthermore, a vacuum switching valve (or simply referred to as a switching valve) 19 is placed in the communication conduit upstream portion 84 at a location immediately before the connection of the communication conduit upstream portion 84 to the communication conduit drain portion 81.

In the intake stroke during the idling time, the accelerating driving time or the high speed driving time (where the vacuum switching valve 19 being closed), the air is instantaneously expanded in the surge tank 31, which has the large passage cross-sectional area, so that the temperature of the air of the surge tank 31 decreases. Therefore, the water and/or oil contained in the air will be likely condensed as the condensed fluid (liquid) in the surge tank 31. The condensed fluid 80 (the condensed fluid of water and/or oil) is guided to the outlet 33 of the lower portion of the surge tank 31 by the gravitational force.

When the operational state of the engine 4 is in the intake stroke during the idling time, the accelerating driving time or the high speed driving time of the vehicle, the downward urging force (pressure difference induced action), which is directed toward the lower side of the surge tank 31, is exerted on the top fluid surface of the condensed fluid 80, which is accumulated in the lower portion of the surge tank 31, due to the presence of the pressure difference. This pressure difference is created by the pressure difference between each intake branch 32, which is closer to the corresponding cylinder of the engine 4, and the surge tank 31 (the pressure of the intake branch 32<the pressure of the surge tank 31), and the pressure difference (the pressure of the intake branch 32<the pressure of the surge tank 31) generated by the difference between the flow velocity of the air in the surge tank 31, which has the larger intake passage cross-sectional area in comparison to the other part, and the flow velocity of the air in the intake branch 32, which has the smaller intake passage cross-sectional area in comparison to the surge tank 31 (the flow velocity of the air in the intake branch 32>the flow velocity of the air in the surge tank 31). Thereby, the condensed fluid 80, which is accumulated in the lower portion of the surge tank 31, is pushed by the pressure difference (differential pressure) between the surge tank 31 and the intake branch 32 toward the intake branch 32 side through the communication conduit drain portion 81.

In the decelerating driving time of the vehicle (the time of exerting the maximum differential pressure), during which the negative pressure in the intake manifold is maximum, the suctioning performance is large. Therefore, in the decelerating driving time, in order to keep the suctioning quantity of the condensed fluid 80 below a misfiring limit quantity, below which the misfiring caused by the condensed fluid 80 does not occur in the cylinder, the energization of the control device 14 is duty controlled to have each corresponding energization time t1, which shortens a valve open time period of the vacuum switching valve 19 in comparison to, for example, that of the normal driving time (see FIGS. 17A and 18). This energization time t1 is repeated after the corresponding non-energization time in the duty control operation, as shown in FIG. 17A.

In the normal driving time of the vehicle (the time of exerting the minimum differential pressure), during which the negative pressure in the intake manifold is minimum, the suctioning performance is small. Therefore, in the normal driving time, in order to keep the suctioning quantity of the condensed fluid 80 below the misfiring limit quantity, the energization to the control device 14 is duty controlled to have each corresponding energization time t2, which lengthens the valve open time period of the vacuum switching valve 19 in comparison to, for example, that of the decelerating driving time (see FIGS. 17B and 18). This energization time t2 is repeated after the corresponding non-energization time in the duty control operation, as shown in FIG. 17B.

In the decelerating driving time and the normal driving time of the vehicle, the pressure difference (differential pressure) between the upstream side of the throttle valve 2 and the downstream side of the throttle valve 2 (the pressure of the air on the upstream side of the throttle valve 2>the pressure of the air on the downstream side of the throttle valve 2) is used to push, i.e., pump the condensed fluid 80 in the communication pipe 8 to the intake branch 32 to conduct the condensed fluid 80 into the cylinder of the engine 4.

Furthermore, in the idling time, the accelerating time or the high speed driving time of the vehicle, the control device 14 closes the vacuum switching valve 19. Therefore, the communication pipe 8 will not have a substantial influence on the air quantity control operation, which controls the quantity of the air supplied to the cylinders of the engine 4 during the idling time, the accelerating time or the high speed driving time of the vehicle.

In the vehicle air intake apparatus of the ninth embodiment, the vacuum switching valve 19 is placed in the communication conduit upstream portion 84 at the location immediate before the connection of the communication conduit upstream portion 84 to the communication conduit drain portion 81 on the upstream side of the connection of the communication conduit upstream portion 84. Therefore, the length of the passage for taking the pressure is short, and thereby the pressure difference (differential pressure) relative to the upper portion of the intake branch 32 becomes large. As a result, a suctioning performance of a gas-liquid separating film 90 described in an eleventh embodiment can be improved in a case where the gas-liquid separating film 90 is provided between the vacuum switching valve 19 and the connecting portion, through which the communication conduit upstream portion 84 is connected to the communication conduit drain portion 81. Furthermore, the length of the passage for taking the pressure is short, so that it is possible to have a high degree of freedom with respect to installation layout of the vehicle intake apparatus on the vehicle.

Tenth Embodiment

Figure 12:
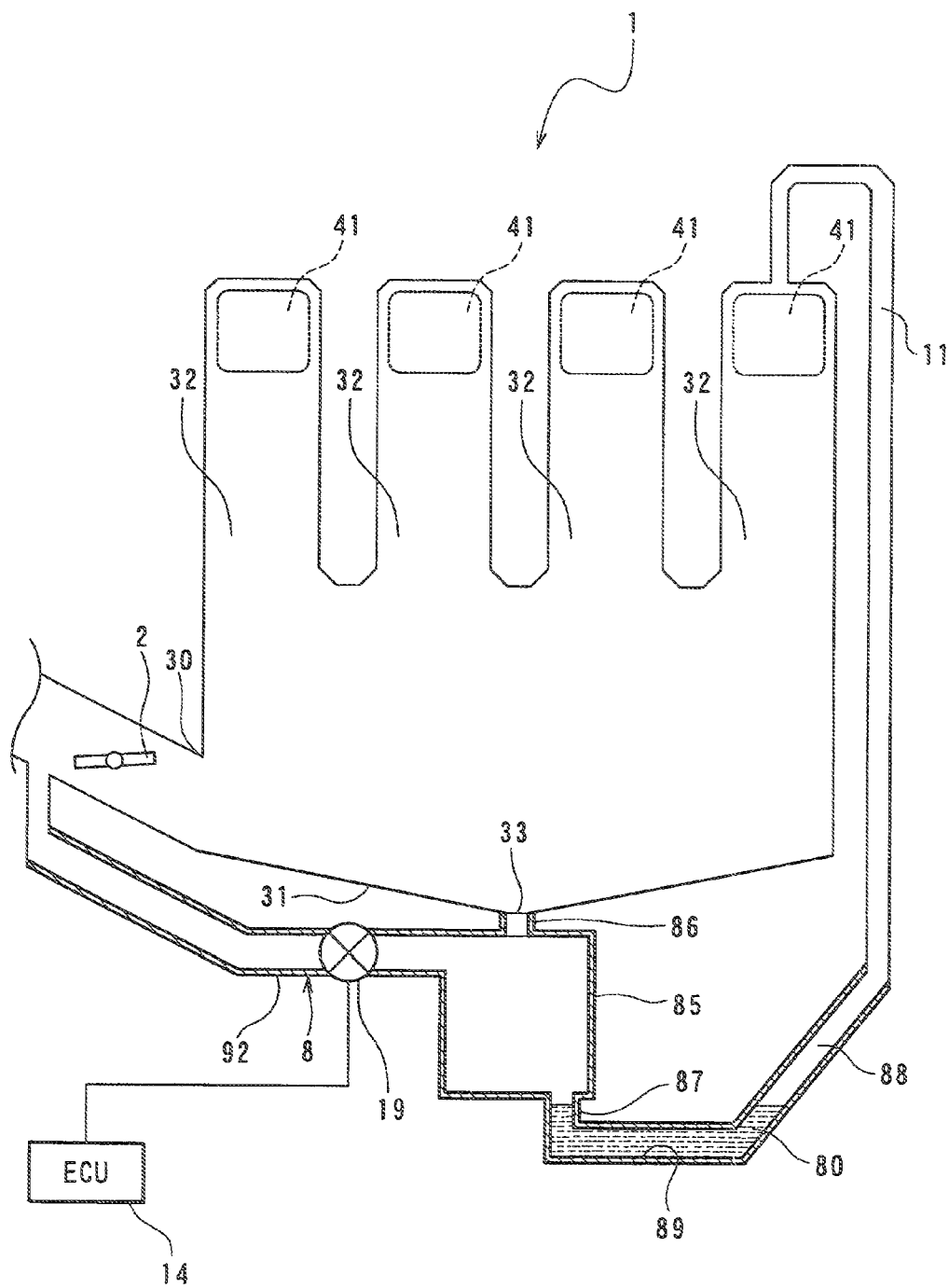
FIG. 12 is a schematic diagram showing a vehicle air intake apparatus according to a tenth embodiment of the present invention.

A vehicle air intake apparatus according to a tenth embodiment of the present invention shown in FIG. 12 differs from the vehicle air intake apparatus of the ninth embodiment with respect to the following points.

In the vehicle air intake apparatus of the tenth embodiment, a storage tank (also referred to as a tank portion) 85 is provided on a lower side of the surge tank 31, and a drain conduit 86 is provided to connect between the outlet 33 of the lower portion of the surge tank 31 and the storage tank 85.

A condensed fluid storage chamber (also referred to as a U-shaped conduit) 89 of a generally U-shaped form is formed by a communication conduit drain portion (communication passage drain portion) 87 and a communication conduit downstream portion (communication passage downstream portion) 88 and is placed on the lower side of the storage tank 85. The communication conduit drain portion 87 extends downward in the direction of gravity (vertical direction) from the outlet of the storage tank 85. The communication conduit downstream portion 88 extends in the horizontal direction from an end of the communication conduit drain portion 87 and then extends obliquely upward.

A rear end (downstream end) of a communication conduit upstream portion (communication passage upstream portion) 92 is connected to an upper portion of the storage tank 85. The vacuum switching valve 19 is placed at or adjacent to a connection of the communication conduit upstream portion 92, which connects to the storage tank 85. Therefore, the larger amount of the condensed fluid 80 can be stored. The condensed fluid storage chamber 89 and the storage tank 85 may serve as a volume portion.

Eleventh Embodiment

Figure 13:
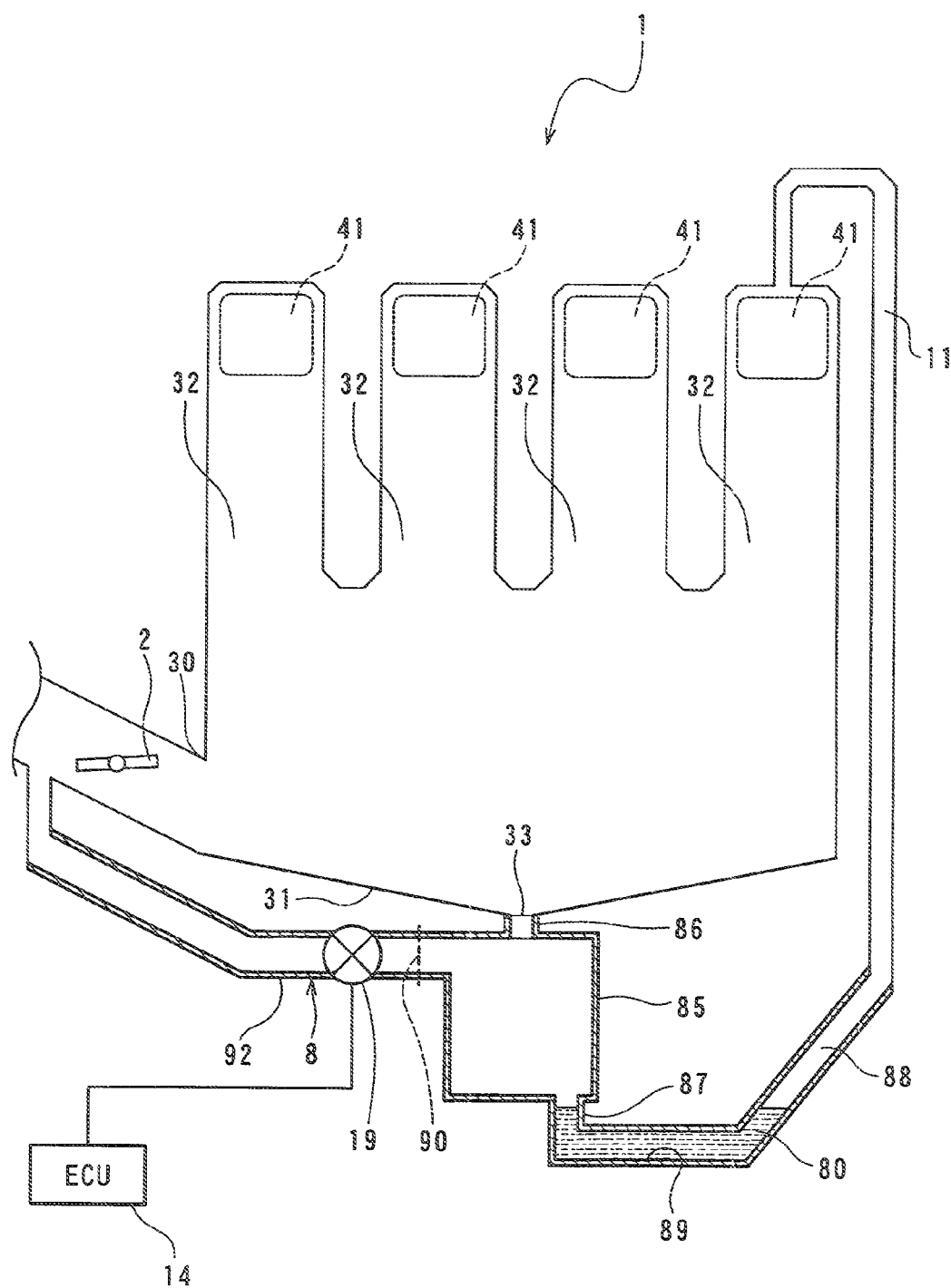
FIG. 13 is a schematic diagram showing a vehicle air intake apparatus according to an eleventh embodiment of the present invention.

A vehicle air intake apparatus according to an eleventh embodiment of the present invention shown in FIG. 13 differs from the vehicle air intake apparatus of the tenth embodiment with respect to the following points.

A gas-liquid separating film 90 is provided between the vacuum switching valve 19 and a connecting portion, through which the communication conduit upstream portion 92 is connected to the upper portion of the storage tank 85. Therefore, it is possible to limit the intrusion of the condensed fluid 80 to the vacuum switching valve 19.

Twelfth Embodiment

Figure 14:
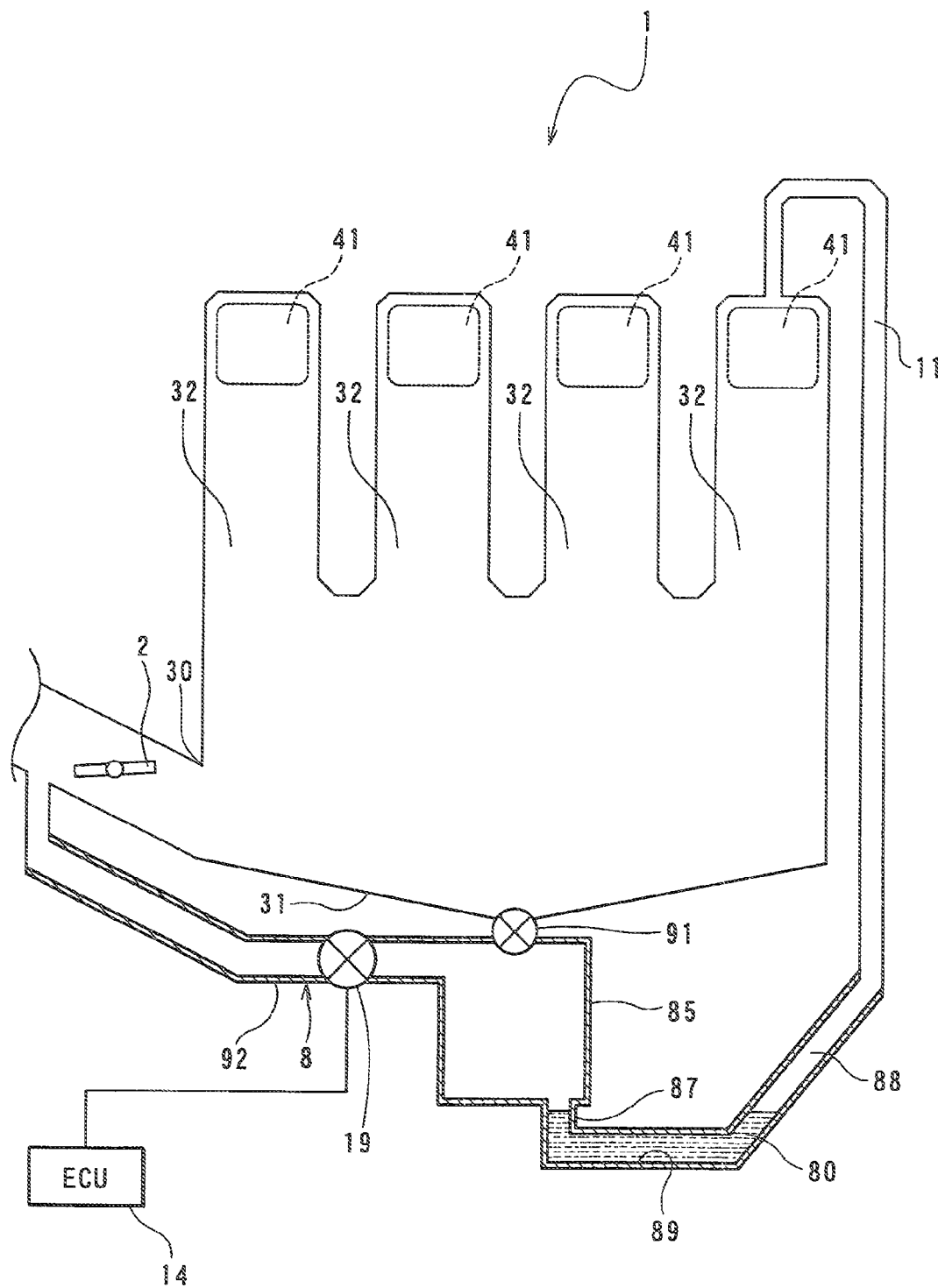
FIG. 14 is a schematic diagram showing a vehicle air intake apparatus according to a twelfth embodiment of the present invention.

A vehicle air intake apparatus according to a twelfth embodiment of the present invention shown in FIG. 14 differs from the vehicle air intake apparatus of the tenth embodiment with respect to the following points.

A check valve 91 is provided in the drain conduit 86 (see FIG. 12). The check valve 91 enables the flow of the fluid (air or liquid) only from the surge tank 31 to the storage tank 85 in the drain conduit 86 and disables the flow of the fluid (air or liquid) from the storage tank 85 to the surge tank 31 in the drain conduit 86.

In the open state of the vacuum switching valve 19 (the normal driving time or the decelerating driving time of the vehicle), the pressure in the storage tank 85 is larger than the pressure in the surge tank 31, and the check valve 91 does not pass the fluid (air or liquid) therethrough. Therefore, it is possible to eliminate a decrease in the atmospheric pressure, which would be caused by flow of the air into the surge tank 31 in the open state of the vacuum switching valve 19. Therefore, the suctioning of the condensed fluid 80 can be improved.

In the closed state of the vacuum switching valve 19 (the accelerating driving time), the pressure in the surge tank 31 is larger than the pressure in the storage tank 85, and the check valve 91 passes the fluid (air or liquid) from the surge tank 31 to the storage tank 85. Therefore, the condensed fluid 80 can be conducted from the surge tank 31 to the storage tank 85 and can be stored in the storage tank 85.

Thirteenth Embodiment

Figure 15:
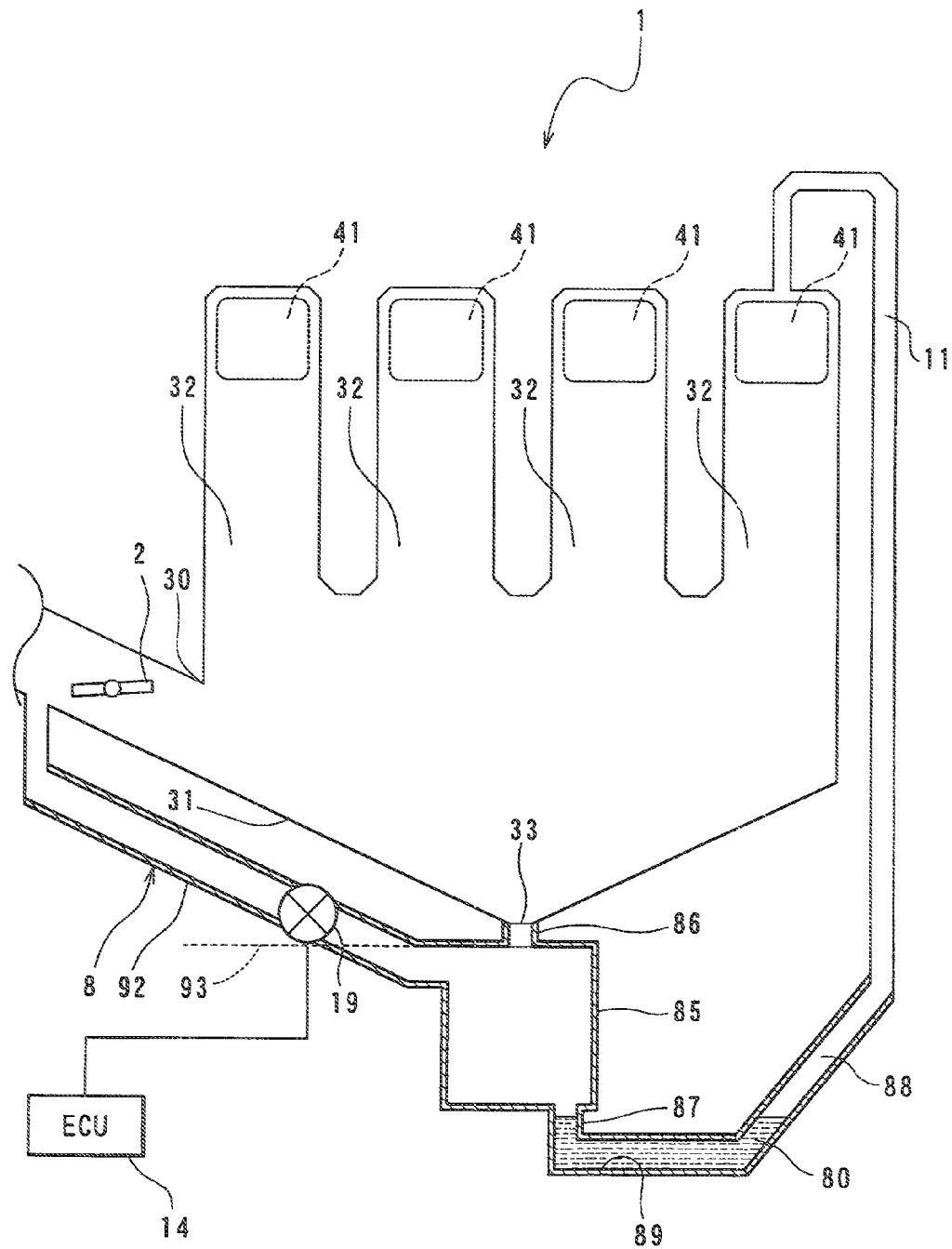
FIG. 15 is a schematic diagram showing a vehicle air intake apparatus according to a thirteenth embodiment of the present invention.

A vehicle air intake apparatus according to a thirteenth embodiment of the present invention shown in FIG. 15 differs from the vehicle air intake apparatus of the tenth embodiment with respect to the following points.

In the vehicle air intake apparatus of the thirteenth embodiment, the vacuum switching valve 19 is provided in a portion of the communication conduit upstream portion 92, which is located on the upper side of a full fluid level surface (or simply referred to as a full fluid level) 93 of the storage tank 85 (top fluid surface of the condensed fluid that fully fills the storage tank 85).

Therefore, in the case where a large quantity of the condensed fluid 80 is generated, it is possible to limit intrusion of the condensed fluid into the vacuum switching valve 19.

Fourteenth Embodiment

Figure 16:
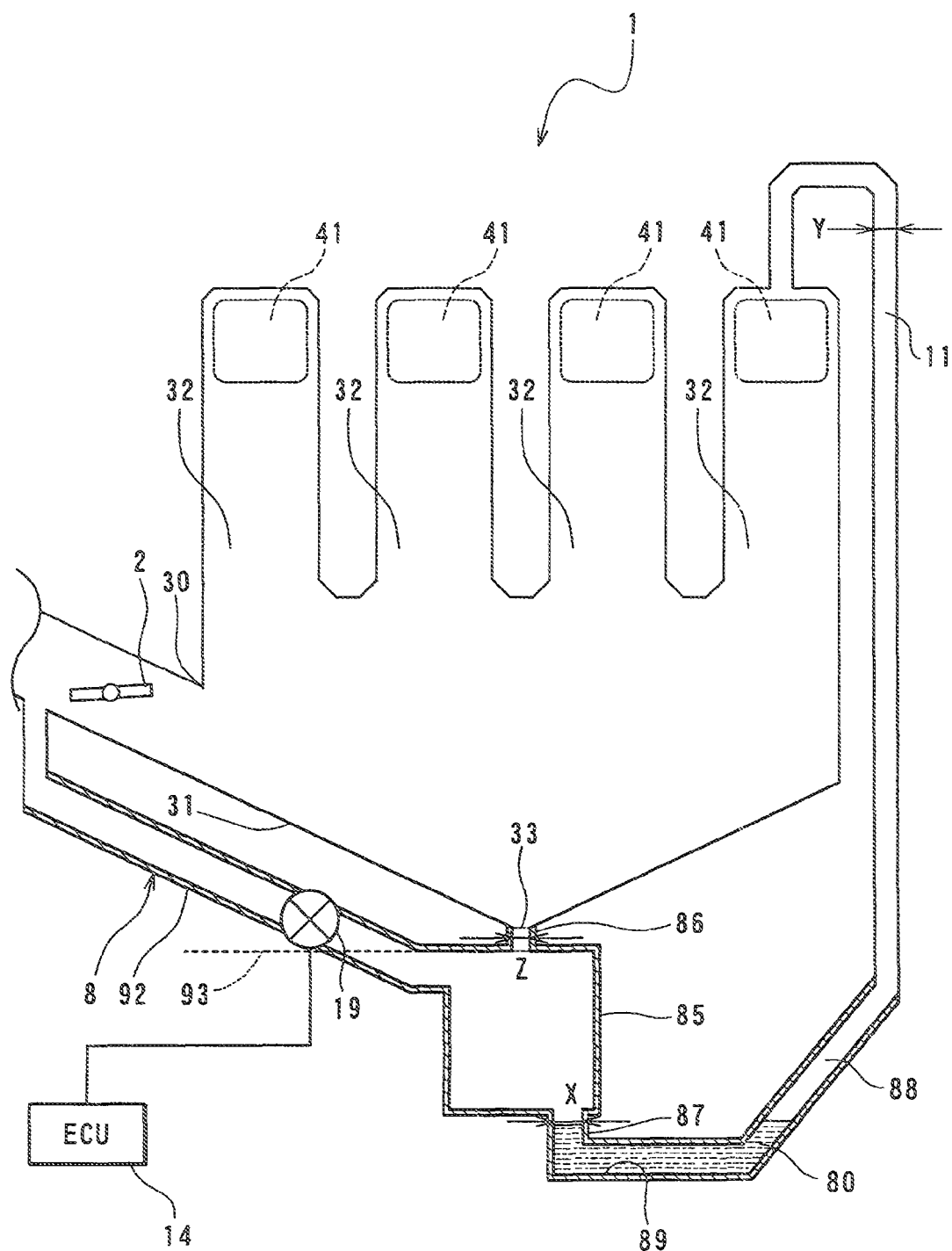
FIG. 16 is a schematic diagram showing a vehicle air intake apparatus according to a fourteenth embodiment of the present invention.

A vehicle air intake apparatus according to a fourteenth embodiment of the present invention shown in FIG. 16 differs from the vehicle air intake apparatus of the thirteenth embodiment with respect to the following points.

In the vehicle air intake apparatus of the present embodiment, an inner diameter z (or a cross-sectional area) of the drain conduit 86, which extends from the outlet 33 of the lower portion of the surge tank 31 to the storage tank 85, an inner diameter x (or a cross-sectional area) of an inlet of the communication conduit drain portion 87, which extends downward from the lower portion of the storage tank 85, and an inner diameter y (or a cross-sectional area) of an outlet of the communication conduit downstream portion 88, which is communicated with the upper portion of the intake branch 32, are set to satisfy a relationship of $x \geq y > z$.

In comparison to a comparative case where a relationship of $x < y$ is satisfied, when the relationship of $x \geq y$ is satisfied, the upwardly pushing force for upwardly pushing the condensed fluid 80 becomes larger than the downwardly pushing force for downwardly pushing the condensed fluid 80. Therefore, the suctioning performance for suctioning the condensed fluid 80 through the communication conduit 11 is improved.

When the relationship of $y > z$ is satisfied, a pressure loss at the outlet 33 of the lower portion of the surge tank 31 can be limited. Thereby, it is possible to limit a decrease in the upwardly pushing force for upwardly pushing the condensed fluid 80.

Now, modifications of the above embodiments will be described.

The location of the connection between the drain conduit 12 and the surge tank 31 recited in the above embodiments is the mere example, and this location of the connection may be modified. For example, the connection may connects between the drain conduit 12 and a lower portion of a fluid accumulating portion, which is provided at a location other than the bottom portion of the surge tank 31 and accumulates the fluid.

Furthermore, the switching valve 13 of the present invention is the vacuum switching valve (VSV) and can implement the desired opening or closing operation thereof by the control device 14.

The fourth and fifth embodiments are applied to the first embodiment, i.e., are the modifications of the first embodiment. However, the present invention is not limited this. For instance, the fourth or fifth embodiment may be applied to the second or third embodiment.

The present invention may be implemented in an air intake apparatus of a diesel engine or an air intake apparatus of a gasoline engine. Furthermore, the present invention may be applied to an air intake apparatus of an internal combustion engine, which uses another type of fuel (e.g., alcohol fuel).

Furthermore, the vehicle air intake apparatus 1 of the present invention may be used for another purpose, which is other than the draining of the fluid in the surge tank 31.

Any one or more of the components of any one of the above described embodiments and modifications may be combined with any one or more of the components of any other one or more of the above described embodiments and modifications. For instance, besides the tenth to fourteenth embodiments, the duty control operation of the ninth embodiment may be also applicable to any one or more of the first to eighth embodiments.

Additional advantages and modifications will readily occur to those skilled in the art. The invention in its broader terms is therefore not limited to the specific details, representative apparatus, and illustrative examples shown and described.

What is claimed is:

1. An air intake apparatus for a vehicle, comprising:
   a throttle valve that is placed in an intake passage and is adapted to adjust a quantity of air to be drawn into an internal combustion engine of the vehicle;
   an intake manifold that is located on a downstream side of the throttle valve in a flow direction of the air in the intake passage and includes:
   a surge tank that has an enlarged passage cross-sectional area, which is larger than a passage cross-sectional area of an adjacent upstream portion of the intake passage that is adjacent to the surge tank and is located on an upstream side of the surge tank in the flow direction of the air; and
   a plurality of intake branches, each of which is located on a downstream side of the surge tank in the flow direction of the air and guides the air toward a corresponding one of a plurality of cylinders of the internal combustion engine, wherein a lower edge of each connection between the surge tank and a corresponding one of the plurality of intake branches is placed above a lower portion of the surge tank in a vertical direction in an installed state of the air intake apparatus where the air intake apparatus is installed to the vehicle;
   a communication conduit that communicates between an upstream portion of the intake passage, which is located on an upstream side of the throttle valve in the flow direction of the air, and at least one of the plurality of intake branches while bypassing the surge tank;
   a drain conduit that communicates between the lower portion of the surge tank and the communication conduit in the installed state of the air intake apparatus;
   a switching valve that is placed on an upstream side of a connection between the communication conduit and the drain conduit in the flow direction of the air in the communication conduit and is adapted to open or close the communication conduit; and
   a control device that controls the switching valve to open or close the switching valve, wherein the control device closes the switching valve when an operational state of the internal combustion engine is in one of idling time, accelerating driving time and high speed driving time of the vehicle, and the control device opens the switching valve when the operational state of the internal combustion engine is in decelerating driving time of the vehicle.

2. The air intake apparatus according to claim 1, wherein:
a check valve is provided in the drain conduit; and
the check valve enables flow of the air from the surge tank to the communication conduit in the drain conduit and disables flow of the air from the communication conduit to the surge tank in the drain conduit.

3. The air intake apparatus according to claim 1, wherein:
the switching valve is a first switching valve;
a second switching valve is provided in the drain conduit and is adapted to open or close the drain conduit;
the control device opens the second switching valve when the first switching valve is closed; and
the control device closes the second switching valve when the first switching valve is opened.

4. The air intake apparatus according to claim 1, wherein:
the at least one of the plurality of intake branches, which is communicated with the upstream portion of the intake passage located on the upstream side of the throttle valve through the communication conduit, includes all of the plurality of intake branches; and
the communication conduit is branched into a plurality of distributing conduits, which are connected to the plurality of intake branches, respectively, to distribute fluid conducted through the communication conduit into the plurality of intake branches, respectively.

5. The air intake apparatus according to claim 4, wherein:
a passage length from a branching start point of the communication conduit, from which the plurality of distributing conduits is branched, to each of the plurality of intake branches is generally the same for all of the plurality of branching conduits; and
a passage cross-sectional area is generally the same for all of the plurality of distributing conduits.

6. The air intake apparatus according to claim 1, wherein a volume portion is formed in the communication conduit at a location that is on a lower side of the surge tank in the vertical direction, and the volume portion is adapted to receive fluid of at least one of water and oil, which is accumulated in the surge tank.

7. The air intake apparatus according to claim 6, wherein the volume portion includes a U-shaped conduit, which is configured into a generally U-shape and is formed in an upstream side portion of the communication conduit.

8. The air intake apparatus according to claim 6, wherein the volume portion includes a tank portion, which is formed in an upstream side portion of the communication conduit.

9. The air intake apparatus according to claim 6, wherein the volume portion includes:
a tank portion, which is formed in an upstream side portion of the communication conduit; and
a U-shaped conduit, which is configured into a generally U-shape and is formed on a downstream side of the tank portion in the flow direction of the air.

10. An air intake apparatus for a vehicle, comprising:
a throttle valve that is placed in an intake passage and is adapted to adjust a quantity of air to be drawn into an internal combustion engine of the vehicle;
an intake manifold that is located on a downstream side of the throttle valve in a flow direction of the air in the intake passage and includes:
a surge tank that has an enlarged passage cross-sectional area, which is larger than a passage cross-sectional area of an adjacent upstream portion of the intake passage that is adjacent to the surge tank and is located on an upstream side of the surge tank in the flow direction of the air; and
a plurality of intake branches, each of which is located on a downstream side of the surge tank in the flow direction of the air and guides the air toward a corresponding one of a plurality of cylinders of the internal combustion engine;
a communication conduit that communicates between an upstream portion of the intake passage, which is located on an upstream side of the throttle valve in the flow direction of the air, and an upper portion of at least one of the plurality of intake branches while bypassing the surge tank;
a vacuum switching valve that is placed in the communication conduit and is adapted to open or close the communication conduit; and
a control device that executes a duty control operation of energization of the vacuum switching valve;
the control device stops the energization of the vacuum switching valve to close the vacuum switching valve when an operational state of the internal combustion engine is in one of idling time, accelerating driving time and high speed driving time of the vehicle;
the control device energizes the vacuum switching valve in a manner that shortens each valve open time period of the vacuum switching valve in the duty control operation when the operational state of the internal combustion engine is in decelerating driving time of the vehicle; and
the control device energizes the vacuum switching valve in a manner that lengthens each valve open time period of the vacuum switching valve in the duty control operation when the operational state of the internal combustion engine is in a normal driving time of the vehicle, wherein:
a condensed fluid storage chamber, which is configured into a generally U-shape, is provided at a location that is on a lower side of the surge tank in a vertical direction;
the condensed fluid storage chamber includes:
a communication conduit drain portion, which extends generally in the vertical direction from an outlet of a lower portion of the surge tank; and
a communication conduit downstream portion, which extends from an end of the communication conduit drain portion generally in a horizontal direction and then extends obliquely upward;
a communication conduit upstream portion is formed in the communication conduit and has a rear end connected to an uppermost part of the communication conduit drain portion; and
the vacuum switching valve is placed in the communication conduit upstream portion at a location, which is located immediately before a connection of the communication conduit upstream portion to the communication conduit drain portion.

11. An air intake apparatus for a vehicle, comprising:
a throttle valve that is placed in an intake passage and is adapted to adjust a quantity of air to be drawn into an internal combustion engine of the vehicle;
an intake manifold that is located on a downstream side of the throttle valve in a flow direction of the air in the intake passage and includes:
a surge tank that has an enlarged passage cross-sectional area, which is larger than a passage cross-sectional area of an adjacent upstream portion of the intake passage that is adjacent to the surge tank and is located on an upstream side of the surge tank in the flow direction of the air; and a plurality of intake branches, each of which is located on a downstream side of the surge tank in the flow direction of the air and guides the air toward a corresponding one of a plurality of cylinders of the internal combustion engine;

a communication conduit that communicates between an upstream portion of the intake passage, which is located on an upstream side of the throttle valve in the flow direction of the air, and an upper portion of at least one of the plurality of intake branches while bypassing the surge tank;

a vacuum switching valve that is placed in the communication conduit and is adapted to open or close the communication conduit; and a control device that executes a duty control operation of energization of the vacuum switching valve;

the control device stops the energization of the vacuum switching valve to close the vacuum switching valve when an operational state of the internal combustion engine is in one of idling time, accelerating driving time and high speed driving time of the vehicle;

the control device energizes the vacuum switching valve in a manner that shortens each valve open time period of the vacuum switching valve in the duty control operation when the operational state of the internal combustion engine is in decelerating driving time of the vehicle; and the control device energizes the vacuum switching valve in a manner that lengthens each valve open time period of the vacuum switching valve in the duty control operation when the operational state of the internal combustion engine is in a normal driving time of the vehicle, wherein:

a storage tank is provided at a location that is on a lower side of the surge tank in a vertical direction;

an outlet of a lower portion of the surge tank and the storage tank are communicated with each other through a drain conduit;

a condensed fluid storage chamber, which is configured into a generally U-shape, is provided at a location that is on a lower side of the storage tank in the vertical direction;

the condensed fluid storage chamber includes:

a communication conduit drain portion, which extends from an outlet of a lower portion of the storage tank generally in the vertical direction; and a communication conduit downstream portion, which extends from an end of the communication conduit drain portion generally in a horizontal direction and then extends obliquely upward;

a communication conduit upstream portion is formed in the communication conduit and has a rear end connected to an upper part of the storage tank; and the vacuum switching valve is placed in the communication conduit upstream portion at a location, which is adjacent to a connection of the communication conduit upstream portion to the upper part of the storage tank.

12. The air intake apparatus according to claim 11, wherein a gas-liquid separating film is placed between the vacuum switching valve and the connection of the communication conduit upstream portion to the upper part of the storage tank.

13. The air intake apparatus according to claim 11, wherein:

a check valve is provided in the drain conduit; and the check valve enables flow of fluid from the surge tank to the storage tank in the drain conduit and disables flow of the fluid from the storage tank to the surge tank in the drain conduit.

14. The air intake apparatus according to claim 11, wherein the vacuum switching valve is provided in the communication conduit upstream portion at a location that is on an upper side of a full fluid level of the storage tank.

15. The air intake apparatus according to claim 11, wherein the drain conduit, the communication conduit drain portion and the communication conduit downstream portion satisfy a relationship of $x \geqq y > z$ where:

x denotes an inner diameter of an inlet of the communication conduit drain portion, which extends downward from the outlet of the lower portion of the storage tank;

y denotes an inner diameter of an outlet of the communication conduit downstream portion, which is communicated with the upper portion of the at least one of the plurality of intake branches; and z denotes an inner diameter of the drain conduit, which extends from the outlet of the lower portion of the surge tank to the storage tank.

* * * * *